(12) United States Patent
Smith et al.

(10) Patent No.: US 12,021,842 B2
(45) Date of Patent: *Jun. 25, 2024

(54) HEADLESS BROWSER SYSTEM WITH VIRTUAL API

(71) Applicant: AppBrilliance, Inc., Dripping Springs, TX (US)

(72) Inventors: Charles Eric Smith, Dripping Springs, TX (US); Sergio Gustavo Ayestaran, Buenos Aires (AR)

(73) Assignee: AppBrilliance, Inc., Dripping Springs, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,259

(22) Filed: May 2, 2023

(65) Prior Publication Data
US 2023/0269238 A1  Aug. 24, 2023

Related U.S. Application Data

(63) Continuation of application No. 16/984,348, filed on Aug. 4, 2020, now Pat. No. 11,683,296.

(60) Provisional application No. 62/891,171, filed on Aug. 23, 2019.

(51) Int. Cl.
| | | |
|---|---|---|
| H04L 9/40 | (2022.01) | |
| G06F 16/953 | (2019.01) | |
| G06F 16/957 | (2019.01) | |
| G06Q 20/36 | (2012.01) | |
| H04L 67/01 | (2022.01) | |
| H04L 67/02 | (2022.01) | |

(52) U.S. Cl.
CPC ........ *H04L 63/0414* (2013.01); *G06F 16/953* (2019.01); *G06F 16/957* (2019.01); *G06Q 20/36* (2013.01); *H04L 67/01* (2022.05); *H04L 67/02* (2013.01)

(58) Field of Classification Search
CPC ..... H04L 63/0414; H04L 67/01; H04L 67/02; G06F 16/953; G06F 16/957; G06Q 20/36; G06Q 20/326; G06Q 20/3674; H04W 12/03; H04W 12/069
See application file for complete search history.

(56) References Cited

U.S. PATENT DOCUMENTS

| | | |
|---|---|---|
| 7,885,870 B2 | 2/2011 | Nam et al. |
| 8,332,272 B2 | 12/2012 | Fisher |
| 9,129,340 B1 | 9/2015 | Medina, III et al. |
| 9,177,316 B2 | 11/2015 | Rao |
| 9,372,688 B1 | 6/2016 | Ben-Yair et al. |
| 9,454,410 B2 | 9/2016 | Meijer et al. |
| 9,582,598 B2 | 2/2017 | Kalgi |
| 9,582,600 B1 | 2/2017 | Killian et al. |
| 10,002,115 B1 | 6/2018 | Killian et al. |
| 10,009,773 B2 | 6/2018 | Smith et al. |
| 10,785,651 B2 | 9/2020 | Smith et al. |

(Continued)

OTHER PUBLICATIONS

U.S. Appl. No. 18/195,470, filed May 10, 2023, Smith et al.

(Continued)

*Primary Examiner* — Andrew C Georgandellis
(74) *Attorney, Agent, or Firm* — Jason H. Vick; Sheridan Ross, PC

(57) ABSTRACT

Systems, methods, and computer-readable storage devices to enable virtual API technology embodied in an SDK for use within a mobile application, a mobile payment wallet, or a mobile operating system.

22 Claims, 14 Drawing Sheets

(56) References Cited

U.S. PATENT DOCUMENTS

| | | | |
|---|---|---|---|
| 10,846,154 | B2 | 11/2020 | Smith et al. |
| 11,683,296 | B2 | 6/2023 | Smith et al. |
| 2002/0178354 | A1 | 11/2002 | Ogg et al. |
| 2011/0119601 | A1 | 5/2011 | Knothe et al. |
| 2011/0252305 | A1 | 10/2011 | Tschani et al. |
| 2012/0240203 | A1 | 9/2012 | Kling |
| 2013/0246261 | A1 | 9/2013 | Purves et al. |
| 2013/0346302 | A1 | 12/2013 | Purves et al. |
| 2014/0164944 | A1 | 6/2014 | Sivakumar et al. |
| 2014/0189808 | A1 | 7/2014 | Mahaffey et al. |
| 2014/0379823 | A1 | 12/2014 | Wilsher et al. |
| 2015/0019944 | A1 | 1/2015 | Kalgi |
| 2015/0073959 | A1 | 3/2015 | Connors et al. |
| 2015/0269128 | A1 | 9/2015 | Hepper et al. |
| 2015/0271188 | A1 | 9/2015 | Call |
| 2015/0379554 | A1 | 12/2015 | Copeland |
| 2016/0094575 | A1 | 3/2016 | Shekyan et al. |
| 2016/0164953 | A1 | 6/2016 | Hristov |
| 2017/0070784 | A1 | 3/2017 | Massoudi et al. |
| 2017/0093828 | A1 | 3/2017 | Lupien et al. |
| 2017/0093839 | A1 | 3/2017 | Whiteside et al. |
| 2017/0141953 | A1 | 5/2017 | Vulich et al. |
| 2021/0006977 | A1 | 1/2021 | Smith et al. |
| 2021/0133009 | A1 | 5/2021 | Smith et al. |

OTHER PUBLICATIONS

Office Action for U.S. Appl. No. 15/474,981, dated Jun. 14, 2017.
Office Action for U.S. Appl. No. 15/474,981, dated Nov. 9, 2017.
Notice of Allowance for U.S. Appl. No. 15/474,981, dated Feb. 27, 2018.
Miscellaneous Communication for U.S. Appl. No. 15/474,981, dated Mar. 14, 2018.
Office Action for U.S. Appl. No. 15/981,705, dated May 31, 2019.
Action for U.S. Appl. No. 15/981,705, dated Nov. 21, 2019.
Notice of Allowance for U.S. Appl. No. 15/981,705, dated Jun. 11, 2020.
Office Action for U.S. Appl. No. 15/987,783, dated Feb. 24, 2020.
Notice of Allowance for U.S. Appl. No. 15/987,783, dated Aug. 7, 2020.
Office Action for U.S. Appl. No. 17/090,426, dated Jun. 28, 2022.
Office Action for U.S. Appl. No. 17/090,426, dated May 4, 2023.
Office Action for U.S. Appl. No. 17/018,388, dated Apr. 22, 2022.
Office Action for U.S. Appl. No. 17/018,388, dated Jan. 30, 2023.
Notice of Allowance for U.S. Appl. No. 17/018,388, dated Apr. 3, 2023.
Office Action for U.S. Appl. No. 16/984,348, dated May 27, 2021.
Office Action for U.S. Appl. No. 16/984,348, dated Feb. 2, 2022.
Office Action for U.S. Appl. No. 16/984,348, dated May 31, 2022.
Office Action for U.S. Appl. No. 16/984,348, dated Jan. 12, 2023.
Notice of Allowance for U.S. Appl. No. 16/984,348, dated Mar. 31, 2023.
U.S. Appl. No. 15/474,981, filed Mar. 30, 2017 U.S. Pat. No. 10,009,773.
U.S. Appl. No. 15/987,783, filed May 23, 2018 U.S. Pat. No. 10,846,154.
U.S. Appl. No. 17/090,426, filed Nov. 5, 2020.
U.S. Appl. No. 15/981,705, filed May 16, 2018 U.S. Pat. No. 10,785,651.
U.S. Appl. No. 17/018,388, filed Sep. 11, 2020.
U.S. Appl. No. 18/195,470, filed May 10, 2023.
U.S. Appl. No. 16/984,348, filed Aug. 4, 2020 U.S. Pat. No. 11,683,296.
U.S. Appl. No. 18/381,864, filed Oct. 19, 2023, Smith et al.
Notice of Allowance for U.S. Appl. No. 17/090,426, dated Jun. 21, 2023.
Office Action for U.S. Appl. No. 18/381,864, mailed May 1, 2024.
Office Action for U.S. Appl. No. 18/195,470, mailed Feb. 28, 2024.

HEADLESS BROWSER SYSTEM WITH VIRTUAL API

CROSS REFERENCE TO RELATED APPLICATIONS

This application is a continuation of U.S. patent application Ser. No. 16/984,348, filed Aug. 4, 2020, now U.S. Pat. No. 11,683,296, which claims the benefit of and, under 35 U.S.C. § 119(e), priority to U.S. Provisional Patent Application No. 62/891,171, filed Aug. 23, 2019, entitled "HEADLESS BROWSER SYSTEM WITH VIRTUAL API," each of which are incorporated herein by reference in their entirety.

BACKGROUND

As mobile devices become commonplace, users elect to perform more and more day-today tasks using mobile devices. For example, users may use mobile devices to work on projects that were typically reserved for desktop or laptop computers, such as editing documents and spreadsheets, creating drawings or graphic designs, generating multimedia content, etc. For a mobile device to perform certain tasks, the mobile device may need access to secured user data. However, due to security considerations and pre-existing back-end systems, providing mobile devices access to such secured user data may be challenging.

To illustrate, one day-to-day task in which mobile devices may be used is mobile banking. Increasingly, banking customers prefer to use a mobile device application to manage their money. As a result, banks are deploying mobile banking applications. For small and midsize banks, it may be prohibitively expensive to develop a customized and full-featured mobile banking application (e.g., via in-house development or by hiring a third party development team), including setting up back-end security features and data integrations that enable such an application to communicate to access secured data, such as pre-existing account data, data stored in data warehouses, etc. To provide mobile banking for small and mid-size banks, some vendors use account aggregation, which involves storing user credentials for a bank on an intermediary server and then accessing the bank via the intermediary server. However, the account aggregation approach does not function properly if the bank blocks such accesses from third-party servers for security reasons. Storing user access credentials on intermediary servers (e.g., in the cloud) can also be a security risk. Moreover, the account aggregation approach may be limited to providing read-only account access rather than both read and write account access. As a result, the account aggregation approach may not offer features that involve modifying underlying bank accounts, such as mobile check deposit and fund transfers. Additionally, users may access online banking websites via web browsers on the mobile devices. However, the web sites may be formatted for desktop computers and not mobile devices. Thus, accessing the webpages via a web browser of a user device may result in a negative user experience.

DETAILED DESCRIPTION

Figure 1:
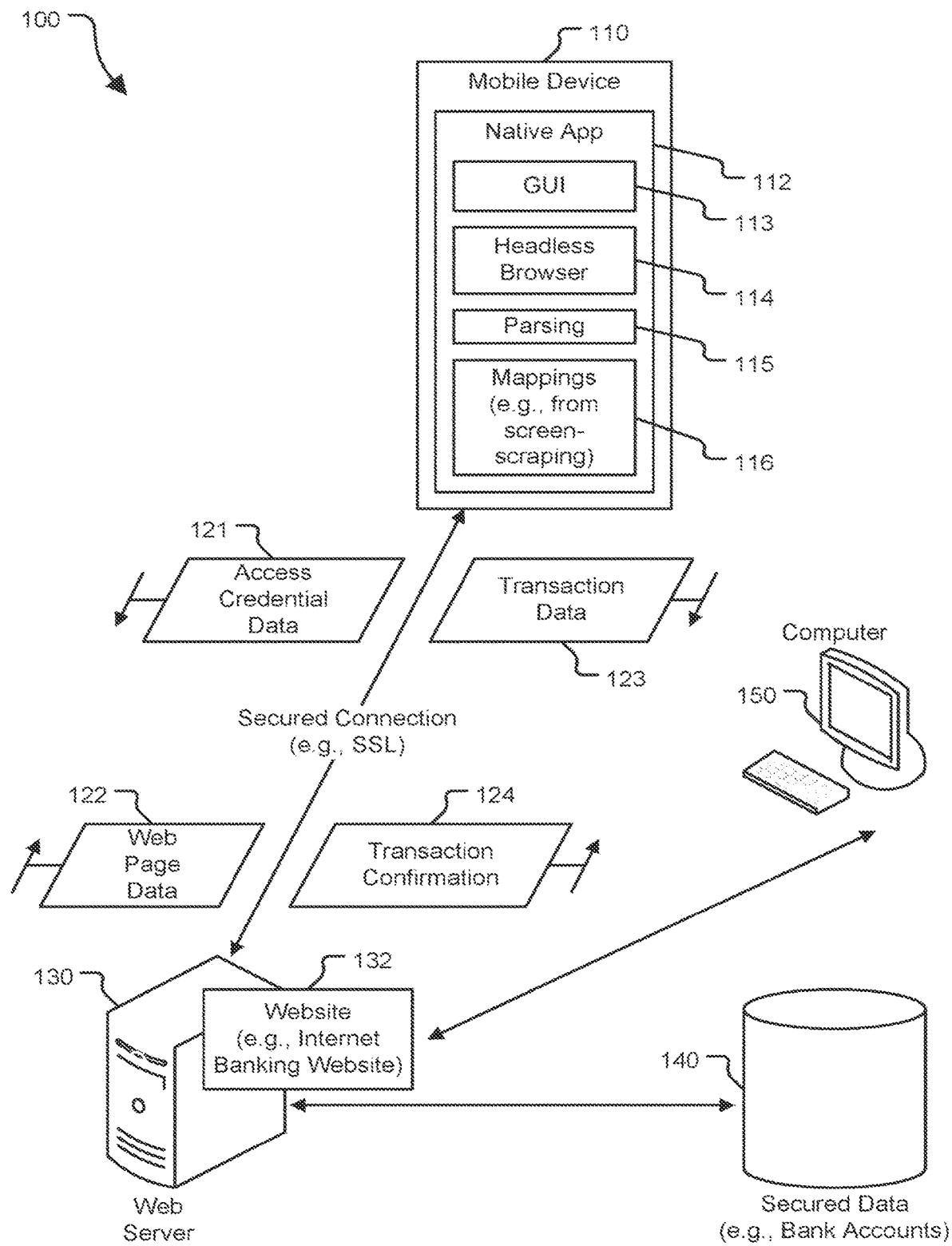
FIG. 1 is a diagram of an illustrative aspect of a system that supports secured data access from a mobile device executing a native mobile application and a headless browser.

The present disclosure enables read and write access to secured data by a mobile device that executes a "native" mobile application (alternatively referred to herein as a "mobile app(s)") and a "headless" browser. As used herein, a "native" mobile app is an application that is designed and coded for a specific device platform, such as for a specific mobile device operating system. Because native apps are created for a specific platform, native apps typically have the same "look and feel" as the underlying operating system and provide more reliable and faster performance than non-native apps. Native apps may also have access to device functionality that is unavailable to non-native apps. In addition, many mobile platform vendors offer storefronts from which users can download native apps. To encourage native app development, platform vendors often offer standardized software development kits (SDKs).

As used herein, a "headless browser" is an instance of a web browser that is executed by a device without display of a graphical user interface (GUI). Thus, while the headless browser may be used to send and receive web data (e.g., via hypertext transfer protocol (HTTP) GET commands, POST commands, etc.), the headless browser itself may not display such web data. Instead, as further described herein, a headless browser may serve as a web access mechanism for a native app on a mobile device.

In particular aspects, the systems and methods of the present disclosure may enable mobile devices to access secured data, such as bank account data, without requiring a provider of the data (e.g., a bank) to implement a technology integration between a mobile solutions provider (e.g., a developer or vendor of a mobile app) and an internet banking software/website provider. Such integrations, which may involve establishing security protocols, data encryption, standards-compliant application programming interfaces (APIs), and/or coordination between different vendors while maintaining compatibility with legacy banking systems, can be complex and expensive. Although various aspects are described herein in the context of banking and financial operations, such descriptions are for illustration only and are not to be considered limiting. The techniques of the present disclosure may additionally or alternatively be used to enable mobile device access to secured data other than banking/financial data, such as healthcare data, enterprise data, or in general any data or data type/format, etc.

In accordance with the described techniques, a mobile device may utilize a native application and a headless mobile browser. In an illustrative non-limiting example, the native application may be a native mobile banking application that is installed (e.g., via download) on a mobile device, such as a smartphone or a tablet. The native application may be "brandable" for a given enterprise, such as a particular financial institution (e.g., bank, credit union, etc.). For a native mobile application, the native application may include features such as account balance reporting, viewing transaction history per account, transferring funds between accounts, performing remote check deposits, paying bills, etc, or in general any banking or transaction functionality. In some examples, the native mobile banking application may have an API to enable integration with (and thereby enable access to) other software and functionality, such as software for peer-to-peer funds transfers, contact-less automated teller machine (ATM) authentication, loan applications, etc.

In some aspects, an API may link the native app to the headless browser to provide a consistent way of implementing customer-facing features and reading/writing data between the native app and servers (e.g., servers associated with a provider of the native app, third party servers, servers hosting an internet banking website, etc.). The native mobile app, the headless browser, and the API may create a personalized data integration, such as for a particular user's bank account, directly from the app.

In some aspects, user access credentials and other access data (such as personal identification numbers (PINs), multi-factor authentication codes, etc.) may be input into the native app and then passed to the headless browser by way of a "virtual API." Although referred to as a "virtual" API, the API may be an embedded API, for instance an API that is "injected" into the browser's context code (e.g., Javascript context when javascript is used as the coding language to be injected) to act as an API between the native app and a webpage accessed by the native app. A formal API in the native code of the platform can be provided to allow the native application to access the specific implementation of each service provided by the virtual API. Note that the virtual notion of API is used here in relation to be a notion of virtual classes, where a given service provided is defined in a high level construct, but the specifics of the implementation may not be yet defined at compile time, this allows the native application to access high level functions in a uniform way (e.g. "list transactions") but the specifics of the steps needed to provide such a service may vary from bank to bank and may be unknown at compile time. Moreover, the specifics of such an implementation for any given website may change over time and it is during run-time that the final implementation is defined and run inside the browser without any binary change in the formal API provided to the native app, thus, not requiring a re-compilation when changes are made. A single call to a service provided by the API can result on a bridging of the call to access a single service of the virtual API running inside the headless browser, or it can trigger multiple calls to different services whose output is used to construct the final output for the API call made by the native application. Special communication channels exist to have the virtual API store data and signaling the status of the process so that in the case where multiple virtual API calls are needed to complete a single native app call, those virtual API services can coordinate and complete the final output.

In accordance with the above example, the API is provided to the native application, and this API should be a real API (just a plain API) for the native application to access, but the internals of how that API is implemented can be a one-to-one relation or a one to many relation. In the one-to-one case, the calls from the native application can be processed and the result can be just a bridge of the call to an embedded API inside the headless browser, in the one-to-many scenario, the call from the native app can trigger multiple calls to an embedded API running inside the headless browser that generates the final output for the host application call. This process can be entirely transparent to the native app In some examples, the virtual API (e.g., the embedded API) may be configured on a per-app basis so that mappings between banking features in the native app and their corresponding internet banking elements on the website may be established, such as via screen-scraping and/or web scraping. Thus, the techniques of the present disclosure may enable a virtual API to be configured for each version of internet banking services/websites to reach a large population of bank users. Configuring virtual APIs (e.g., embedded APIs) in this manner may be simpler than building custom native apps and integrations for each financial institution, because there may only be a few dozen versions of internet banking services/website, whereas there are over 14,000 financial institutions in the United States alone. The systems and methods described herein can provide a technique for end-users to securely and efficiently access internet banking capabilities via a native mobile banking app, while leveraging a secure real-time connection to internet banking, rather than requiring access to a dedicated, expensive, or limited integration specific to the app. Moreover, the present disclosure can enable service providers, such as banks or credit unions, to deploy mobile banking applications without having to implement a dedicated back-end systems integration.

Additionally, or alternatively, the techniques of the present disclosure may enable API fingerprint data (e.g., embedded API fingerprint data) to be determined "on the fly" by a mobile device. For example, the mobile device may be configured to access a particular website even though API fingerprint data for the particular website cannot be found (e.g., at a directory server). The mobile device may be configured to parse web page data received from a remote server to determine mappings between one or more elements of the website and one or more elements of the native application. The mobile device may generate API fingerprint data (also referred to herein as virtual API fingerprint data or embedded API fingerprint data) indicating the mappings, which may be stored at a directory server for future use. Thus, techniques of the present disclosure enable a mobile device to use API fingerprint data to connect to a website, such as an online banking website, and if no API fingerprint data is found, to generate the API fingerprint data at the mobile device.

Referring to FIG. 1, an illustrative aspect of a system is shown and generally designated 100. The system 100 includes a mobile device 110, such as a mobile phone, a tablet computer, a personal digital assistant, a wearable computing device, a portable media player, a computing device of a vehicle, etc. The mobile device 110 includes a memory that stores processor-executable instructions and data corresponding to one or more applications ("apps"). For example, the mobile device 110 may include a native app 112.

In some examples, as further described herein, the native app 112 may be a "branded" version of a mobile banking application that is specific to a financial institution, such as a specific bank or a specific credit union. In a particular aspect, a user of the mobile device 110 may download the native app 112 from an app storefront. In some examples, the native app 112 may be generated based on a generic native app template by adding branding components, such as names, logos, color schemes, typeface schemes, etc. For mobile banking, the native app 112 may be configured to perform banking operations such as an account balance operation, a fund transfer operation, a credit card payment operation, a deposit operation, a withdrawal operation, a bill pay operation, a transaction history operation, etc.

The system 100 also includes a web server 130 located remote to the mobile device 110. The web server 130 (which may correspond to multiple web servers/the cloud in alternative examples) may be configured to host a website 132. In particular examples, the website 132 may be an internet banking website. In some aspects, the website 132 may be a "desktop" version of an internet banking website. To illustrate, the website 132 may deliver content that is formatted for presentation on a desktop or laptop computer, rather than a mobile version of such content that is formatted for presentation on a mobile device. Thus, in some aspects, the web site 132 may typically be used by users at computers, such as an illustrative computer 150, to log in to their financial institution and perform internet banking functions. In other aspects, the website 132 may have content formatted for presentation on a mobile browser. The website 132 may enable a user of the computer 150 to access secured data 140, such as information regarding bank accounts. As another example, the website 132 may enable a user of the computer 150 to view account balances, transaction histories, and credit card information. As yet another example, the website 132 may enable a user of the computer 150 to transfer funds between accounts.

During operation, the mobile device 110 may use the website 132 to access the secured data 140, even if the website 132 includes content that is not formatted for mobile devices. To illustrate, the native app 112 may launch a headless browser 114 to enable communication with the website 132. The headless browser 114 does not include a GUI displayed to a user, although the native app 112 may have a GUI 113 displayed to a user.

In a particular aspect, the headless browser 114 may be combined with the native app 112 to form a single application package that can be downloaded and installed to the mobile device 110. Depending on platform, the headless browser 114 and the native app 112 may be combined or packaged using various methods. According to a first exemplary method, browser code may be included and compiled into the native app 112. According to a second exemplary method, the native app 112 may link to one or more libraries that enable web browsing, such as libraries offered by third parties or a mobile platform vendor (e.g., a mobile device operating system provider). According to a third exemplary method, the native app 112 may make API calls to an operating system of the mobile device 110 to access a dedicated instance of browser software "behind the scenes," where the dedicated instance is under the control of the native app 112.

In accordance with the techniques of the present disclosure, the native app 112 may utilize the headless browser 114 as a proxy. To illustrate, the native app 112 may use the headless browser 114 to emulate a request to login to the website 132 from a non-headless browser, such as a browser of a computer (e.g., the computer 150) in the case of a desktop internet banking website, or a browser of the mobile device 110 in the case of a mobile internet banking website.

To perform the login, the native app 112 may initiate a secured connection from the headless browser 114 to the website 132 and send access credential data 121 to the website 132. For example, the secured connection may be a secure sockets layer (SSL) connection and the native app 112 may send a username and password via SSL to the website 132 using the headless browser 114. To illustrate, the native app 112 may cause the headless browser 114 to request a login page of the website 132 and send the username and password to the website 132, such as by using HTTP GET/POST commands or other commands. In some examples, the access credential data 121 is received via a user input device of the mobile device 110, such as a touchscreen. Alternatively, the access credential data 121 may be retrieved from a memory of the mobile device 110.

The web server 130 may receive the access credential data 121 from the native app 112 for verification. To illustrate, the web server 130 may include software configured to compare the access credential data 121 to previously-stored access credential data. Alternatively, the web server 130 may forward the access credential data 121 to an authentication server. After the access credential data 121 is verified, the web server 130 may transmit web page data 122 to the headless browser 114. For example, the web page data 122 may correspond to the web page of the website 132 that would be sent to the computer 150 after a user of the computer 150 completed a login process of the website 132. Thus, the web page data 122 may include user-specific data, such as the user's name, the user's account number(s), account balance(s), and/or other information corresponding to one or more of the user's checking accounts, savings accounts, credit card accounts, money market accounts, loan accounts, investment accounts, etc.

The native app 112 may parse the web page data 122 to identify the user-specific data and may render such user-specific data for display on the GUI 113 of the native app 112. To illustrate, the native app 112 may include a parsing module 115 configured to parse the web page data 122. In some examples, the native app 112 may access mappings 116 between various web pages and features of the website 13 2 and corresponding GUI elements (e.g., fields, buttons, screens, etc.) of the native app 112. To illustrate, such mappings 116 may be determined using a screen-scraping and/or web scraping operation. Thus, different versions of the native app 112 may be deployed for different financial institutions, different internet banking websites and/or services, etc.

It will be appreciated that by emulating a computer login to the website 132 and displaying user-specific information in the GUI 113, the native app 112 (using the headless browser 114) may enable read access to the secured data 140 by a user of the mobile device 110. The techniques of the present disclosure are not limited to read-only access. For example, during operation of the native app 112, the native app 112 may receive a user command, such as a command to transfer funds between two accounts, as an illustrative non-limiting example. In response, the headless browser 114 may send transaction data 123 to the website 132 via a secured connection, where the transaction data 123 indicates a modification to be made to the secured data 140. For example, the transaction data 123 may correspond to HTTP command(s) that would be issued by the computer 150 when requesting a funds transfer operation on the website 132. Thus, from the perspective of the website 132, there is no difference between transaction data originating from a computer and the transaction data 123 sent by the headless browser 114 at the mobile device 110. Upon receiving the transaction data 123, the web server 130 may take action to modify the secured data 140 (e.g., may initiate the funds transfer operation). After the modification to the secured data 140 is performed, the website 132 may transmit a transaction confirmation 124 to the mobile device 110 to confirm the modification to the secured data 140 (e.g., completion of the funds transfer operation), and the transaction confirmation may optionally be displayed in the GUI 113 of the native app 112. The new balance(s) of the user's account(s) may also be displayed in the GUI 113 the next time the native app 112 performs a read operation on the secured data 140.

In some examples, the native app 112 may enable access to additional software and functionality that is not typically available via the internet banking website 132. For example, the native app 112 may include separate capabilities or integrations to interact with other software and the underlying hardware of the mobile device 110, or with third party service(s) or device(s) via hardware/software interfaces on the mobile device 110. To illustrate, the native app 112 may have an integration with an automated teller machine (ATM) software provider or network and may utilize a short-range wireless transceiver of the mobile device 110 to perform contactless authentication with an ATM.

As another example, the native app 112 may access the internet via a secure network connection and may interact with an external service, such as a peer-to-peer fund transfer service, directly rather than relying on an API to communicate with the internet banking website 132. To illustrate, consider two users that have native apps on their mobile devices, where the native apps operate in accordance with aspects of the present disclosure. The native apps may be for the same financial institution or may be for (and thus including branding associated with) different financial institutions. Each user may interact with the native app on their mobile device, where the native app is integrated with a third-party peer-to-peer fund transfer service (although the peer-to-peer fund transfer service does not have an integration with the bank(s)). The native apps may have access to each user's account information, such as clearinghouse/routing and/or debit/credit card information. For example, such information may previously have been provided by the users or may have been determined from using a headless browser to interact with the banking websites of the bank(s). This information and the native apps may be used to facilitate transfer of money by way of the third-party peer-to-peer service. In some aspects, having the two mobile devices in close proximity may be used for a secure and local discovery option in lieu of requiring entry of account information. To illustrate, for mobile devices in close proximity that are executing their respective native mobile banking apps, authentication may be automatic. If the mobile devices are not executing the apps, the apps may nonetheless "discover" each other via a device feature or service, global positioning system (GPS), short range wireless networking, application-level handshaking, etc. To illustrate, the native app may request the mobile device to "show all users that are have compatible mobile banking apps in discovery mode, have registered with a third-party server in the last thirty seconds, and have GPS coordinates within one meter of me").

The system 100 of FIG. 1 may thus enable read and write access to the secured data 140 by the native app 112 without requiring a dedicated back-end integration between the native app 112 and legacy banking systems. By implementing internet banking features or capabilities as mobile app features, the architecture shown in FIG. 1 may enable banks to more quickly roll out mobile banking functionality. The architecture shown in FIG. 1 may also have several downstream benefits. Such benefits may include, but are not limited to one or more of: (1) inability for a vendor to block accesses by the native app 112; (2) improved security as compared to systems that store the access credential data 121 in the network; (3) improved performance and/or user experience by virtue of utilizing the native app 112 rather than a web app, hybrid app, or conventional web pages access (e.g., as would be performed by the computer 150); (4) ability to save time by deploying the native app 112 without interaction with a provider of the website 132 or requesting the provider to customize access for the bank; and/or (5) ability to integrate third party services, such as loan decisioning software or merchant rewards programs directly in the native app 112 (bypassing the need for these providers to integrate with core or internet banking providers).

Figure 2:
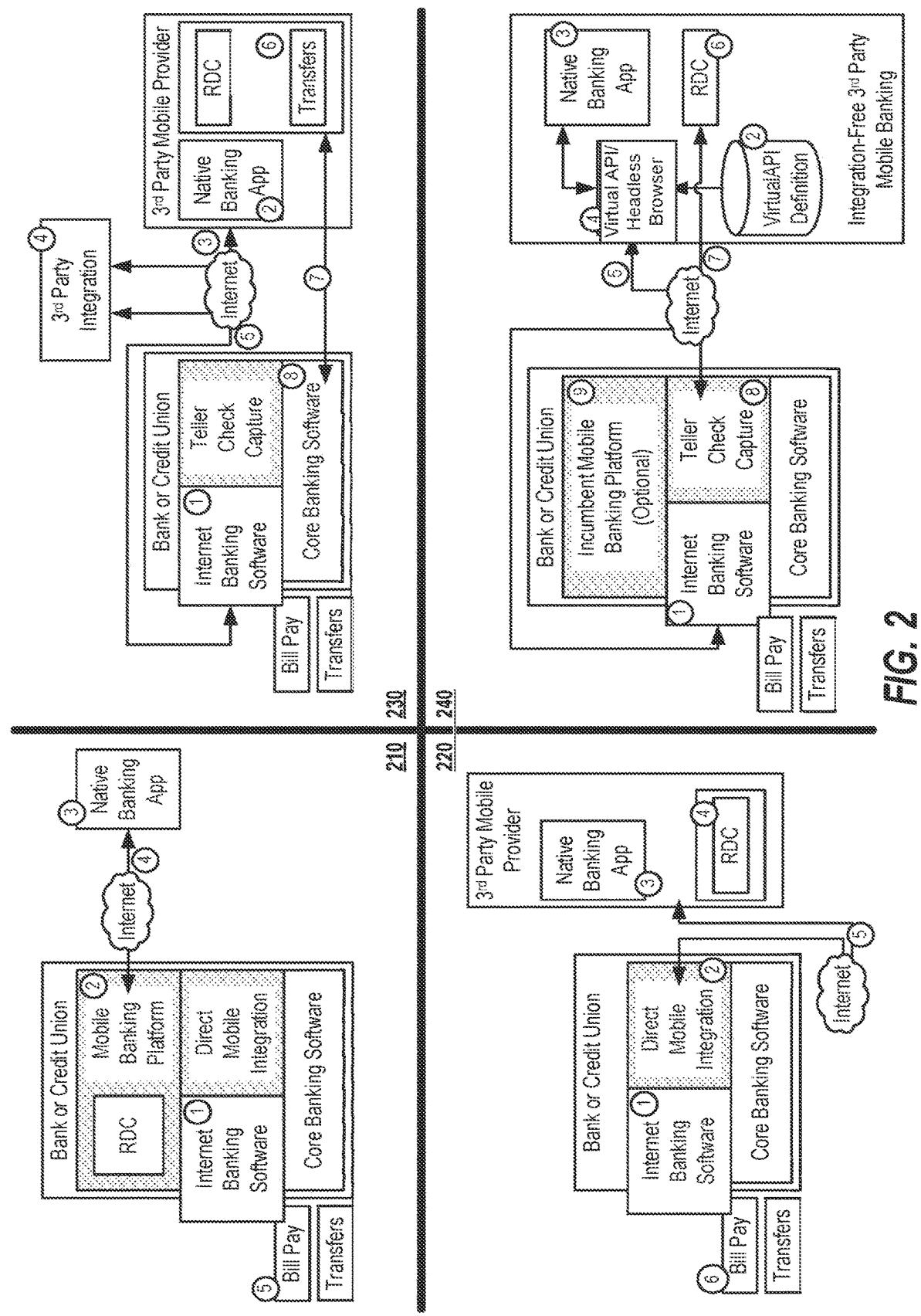
FIG. 2 is a diagram to illustrate aspects of methods of enabling mobile device access to secured data.

The system 100 of FIG. 1 may also provide additional benefits compared to other approaches. For example, FIG. 2 illustrates four mobile banking approaches 210, 220, 230, and 240, where the fourth approach 240 corresponds to the system 100 of FIG. 1.

The exemplary first approach 210 corresponds to custom developed native banking apps or apps offered by incumbent internet banking providers. Referring to element 1 of the first approach 210, the bank or credit union may have existing internet banking software. A customer's access credentials (username/password) and multi-factor authentication may be set up as part of internet banking. It may be standard practice (e.g., in the banking industry) for the access credentials for internet banking to be the same credentials that a user would use for mobile banking, and internet banking (and an associated user account) may be prerequisites for using mobile banking apps. The internet banking software may be configured to integrate with the bank or credit union's "core" banking software, which may handle basic accounting and money-movement functions.

Referring to element 2 of the first approach 210, the bank or credit union may deploy a mobile banking platform with integrated remote deposit capture (RDC) capabilities. This mobile banking platform may be an add-on product that is directly integrated with the bank's existing internet banking software. In most cases, the mobile banking platform may be a product of the same company that supplies the bank or credit union's internet banking software. The mobile banking platform may read and write data to the internet banking software and may provide necessary data (such as account balances, transaction history, etc.) to the native banking app. If users of the native banking app want to make modifications to their accounts (such as transfers, deposits, paying bills, etc.), it is the mobile banking platform that handles these requests and makes the required function calls to internet banking. The mobile banking platform may provide mobile-specific extensions to the internet banking software. These extensions may typically include handling for RDC, but can also include other mobile-specific capabilities that require interaction with bank data or back-end systems.

Referring to element 3 of the first approach 210, the mobile banking platform vendor may provide a native banking application, either branded for the bank or credit union, or configured to access the bank or credit union's systems. This native banking application may be distributed through various mobile platform app stores. The mobile banking application may be "hard-coded" to a specific bank or credit union and may be directly integrated into the mobile banking platform. Referring to element 4 of the first approach 210, the native banking application may directly access the mobile banking platform over a secure network connection and may interact with the mobile banking platform through a private and secure API. Users may enter their internet banking login credentials and/or multi-factor information into the native banking app, and this information may be passed over the secure network connection. The API and protocol may not be open for third parties to develop against, meaning that if a bank or credit union wants to use the mobile banking platform capabilities offered by their internet banking provider, they are limited to using only the native banking application provided (and any per-user costs that come with doing so).

Referring to element 5 of the first approach 210, the internet banking software may provide alternate methods for bill pay and fund transfers for web-based users. In many cases, the mobile banking platform may only offer a subset of the capabilities of internet banking software to native mobile banking app users.

The exemplary second approach 220 corresponds to the use of third-party mobile platforms to deliver mobile banking. The internet banking software shown at element 1 of the second approach 220 may operate similarly to the internet banking software shown at element 1 of the first approach 210. Referring to element 2 of the second approach 220, some internet banking software providers may provide direct mobile integration capabilities for use by third parties or by the bank or credit union if they elect to develop their own native mobile banking app. This integration interface may often be "tolled" or licensed separately to the internet banking software, making the adoption of third-party mobile applications or in-house developed applications expensive for the bank or credit union. Where such direct mobile integrations are available, they may enable mobile banking applications to interact with internet banking software via a secure and proprietary API. However, such integrations may not provide access to all of the features that are available in internet banking or may not provide integrations for mobile-only capabilities (e.g., RDC), which may require the bank or credit union to adopt additional services (or implement such integration themselves) to provide access to such features.

Referring to element 3 of the second approach 220, the bank or credit union can develop their own native banking application or adopt a third-party application that is compatible with their internet banking software. The native banking application may be distributed through various mobile platform app stores. The mobile banking application may be hard-coded to a specific bank or credit union and may be linked to the internet banking software used by that financial institution.

Referring to element 4 of the second approach 220, mobile-specific features like RDC may be integrated into the native mobile banking app and may be dependent on third party service adoption by the bank or credit union for processing or integration. This may add cost and complexity for adoption if the mobile-specific services are not directly supported by the direct mobile integration for a given internet banking software platform. Referring to element 5 of the second approach 220, the native banking application may access internet banking for a bank or credit union by interfacing with the direct mobile integration over a secure network connection, and through a proprietary and secure API. Users may enter their internet banking login credentials and/or multi-factor information into the native banking app, and this information may be passed over the secure network connection. Unlike the first approach 210, in the second approach 220 the API and protocol may be open for third parties to develop against. However, access to the API may be controlled by the internet banking software provider, which may result in both business and technical restrictions that reduce the attractiveness of third-party solutions.

Referring to element 6, the internet banking software may provide alternate methods for bill pay and fund transfers for web-based users. In most cases, the mobile banking platform may only offer a subset of the capabilities of internet banking software to native mobile banking app users.

The exemplary third approach 230 corresponds to "integration free" apps that rely on third party mobile platforms. Referring to element 1 of the third approach 230, Customer access credentials (username/password) and multi-factor authentication may be set up as part of internet banking. It may be standard practice (e.g., in the banking industry) for the access credentials for internet banking to be the same credentials that a user would use for mobile banking, and internet banking (and an associated user account) may be prerequisites for using mobile banking apps. The internet banking software may contain functionality to secure user accounts by limiting access to the internet banking website to validated users. Because bank accounts may be high-value targets for hackers, banks and credit unions often configure their internet banking software to limit access to only certain client browsers, identified by cookies or other means, which have previously accessed the system after successfully passing extra security challenges such as multifactor authentication. For example, a browser that had previously passed multi-factor authentication would be identified, and a username/password may be considered sufficient for future access from that browser. The internet banking software may also be configured to integrate with the bank or credit union's "core" banking software, which may handle basic accounting and money-movement functions.

Referring to element 2 of the third approach 230, the bank or credit union may engage a third-party vendor for native banking applications or end-users to use native banking applications that are designed to access multiple banking, utility and credit card accounts. Applications of this type may not directly interact with a bank or credit union's internet banking software, and may instead rely on account aggregation services for access to account information, such as available balances, transaction history, etc. These native banking applications may be distributed through various mobile platform app stores, either as branded applications for the bank or credit union or under some other consumer brand for financial management services.

If the mobile banking application is branded for a specific bank or credit union, it is hardcoded to that institution. However, unlike other scenarios, this link may be indirect. Instead of referencing the financial institution's internet banking uniform resource locator (URL) or other web service address linked to the bank or credit union's back-end systems, these mobile banking apps may reference an institution identifier (ID) that uniquely identifies the bank or credit union with one or more account aggregation services. Bank username/password credentials may be passed along with this institution ID and may enable these native banking applications to access aggregated user financial information from third party services.

Referring to element 3 of the third approach 230, the native banking application may utilize a proprietary API for a given account aggregator. The native banking application may use a secure network connection to transmit application/developer credentials along with the institution ID and (e.g., on first login) the username and password for internet banking for a given bank or credit union's customer. On subsequent logins, the application may pass a user token or other unique identifier that acts as a secure alternative to the user's username and password, so that the native mobile application does not have to store the user's access credentials. Instead, those credentials may be stored with the account aggregation service (e.g., in the cloud). On first login, the secure connection may also be used to pass multi-factor authentication challenge(s) and responses between the account aggregator and the native banking application. These multi-factor authentication challenges may be triggered by the account aggregator initiating a new web session request with the bank or credit union's internet banking system on behalf of the native banking application user. User responses to multi-factor authentication challenges are passed back over this secure channel to the account aggregator and, if valid, may be stored for future use. Other than passing login credentials and multi-factor authentication challenge information indirectly to internet banking, secure network traffic using this API is read-only.

Referring to element 4 of the third approach 230, the account aggregator may provide services to developers who have authorization from end-users. These users may elect to use native banking apps to access their banking, credit card, or other account information. The account aggregators may maintain internet services that operate cloud-based web browsers that use stored authentication credentials for users to log into internet banking software on their behalf. The browsers may view and capture account information for a user's account, either on a periodic schedule (e.g., daily/hourly), or on-demand (e.g., in real-time or near-real-time) when a user accesses a native banking application that is enabled by these services.

The account aggregator may store personal financial data in a database and may make the personal financial data available for display or download to the native banking application via secure network connection. Because these services are coming from a third party, and because the servers that host these browser sessions may handle requests for many thousands of simultaneous users across many thousands of banks and credit unions, the account aggregator system illustrated in the third approach 230 tends to have a single point of failure. Because the bank or credit union may not be directly aware that a user is relying on these third party services for any particular session, the bank or credit union (or the internet banking software provider that is providing the software/infrastructure that is being accessed) may block the account aggregator services from accessing internet banking. This can affect one bank or credit union, or, if the block is done by a major internet banking software provider, it can affect thousands of financial institutions. As a result, banks or credit unions that use third party mobile banking service providers leveraging account aggregation technology often require that the third-party mobile banking providers have multiple, redundant account aggregation connections to maintain high levels of service availability, which may increase cost and complexity.

Referring to element 5 of the third approach 230, a secure (e.g., SSL) web connection between the account aggregator's web browsers running in their cloud servers and the internet banking software for a bank or credit union may be established. This connection may be made every time that the account aggregator updates user data. The user authentication data needed for logging in to internet banking may be passed each time, and may therefore be stored by the account aggregator (e.g., at a network server and/or cloud server). A downside of this approach is that many of these browser connections may come from the same internet protocol (IP) address and may thus trigger false positive security warnings with the internet banking software provider.

Referring to element 6 of the third approach 230, because the third approach does not directly interact with internet banking, services that "write" data to a user's account at the financial institution, such as RDC and transfers may require a separate back-end integration with the core banking software for the financial institution. There are some standards-based methods for handling transfers and remote deposits/check images. By bypassing the need to integrate with internet banking software, banks and credit unions may be able to avoid fees associated with mobile banking or dedicated mobile banking interfaces. However, such benefits may be offset by the added complexity of integrating directly with core banking software, and, in the case of RDC, the need to use processes for check verification that are often different than an existing teller check capture system in place at the bank or credit union.

Element 6 of the third approach 230 also addresses the ability of native banking applications powered by account aggregation to work around the lack of integration with key services. One area where this approach is unable to offer feature-parity with other systems is with bill payment services, which are typically available in internet banking software. The native mobile banking applications of the third approach 230 may not be able to interact with internet banking bill pay systems, requiring the bank or credit union to either not offer the feature or to offer a parallel and dedicated mobile banking bill payment system that integrates with the native mobile banking application but relies on third party automated clearing house (ACH) settlement or custom core integration for money movement. Such mobile-only solutions may introduce significant user experience challenges, with the potential for double-payment of bills.

Referring to element 7 of the third approach 230, transaction data may be written to a file and transferred over a secure connection (such as secure file transfer protocol (SFTP)) from servers run by the third party native mobile banking provider to the bank or credit union's backend systems. From there, the transactions may be "posted" to the core banking software using various integration techniques that may vary by vendor.

Referring to element 8 of the third approach 230, most core banking software systems may not be real-time. As a result, mobile transactions, such as transfers, deposits, etc., may need to be "synced" with the core banking software. Until they are synced, these "write" transactions do not show up in internet banking (e.g., are not visible when a user checks their account balances), and are accounted for separately in the native mobile banking app. This secondary integration requirement and disconnect from internet banking can result in cases where information displayed in the native mobile banking application does not accurately reflect the user's actual account status.

The exemplary fourth approach 240 corresponds to integration-free third-party mobile banking in accordance with the present disclosure. Referring to element 1 of the fourth approach 240, the bank or credit union may have existing internet banking software available for their customers. The customer's access credentials (e.g., username/password) and/or multi-factor authentication may be set up as part of internet banking. It may be standard practice in the industry for the access credentials for internet banking to be the same credentials that a user would use for mobile banking, and internet banking and an associated user account may be prerequisites for using mobile banking apps. The internet banking software may be configured to communicate with the bank or credit union's core banking software, which may handle basic accounting and money-movement functions.

Referring to element 2 of the fourth approach 240, the systems and methods of the present disclosure may create a "fingerprint" of the internet banking service pathways used for a user to log in, authenticate, and take other actions possible with internet banking. This unique service fingerprint may be stored at a server and may be loaded (e.g., at runtime) into the native mobile banking app as an API component, such as an embedded API component (e.g., a "virtual" API component), that configures headless browser interaction with the native mobile banking app. The embedded API component may be referred to as a "virtual" API component with respect to FIG. 2, however, the virtual API component is an actual API component that provides an interface between the native app (using the headless browser) and the internet banking website. For example, the embedded API may provide, using the headless browser, an interface between the native app and the internet banking website. This fingerprint may also enable identification of changes that occur to the internet banking software. These changes may trigger automated validation processes that verify that user accounts can (continue to) be accessed correctly. In the event that there is a change detected in the API fingerprint for a given bank or credit union, a process may be triggered to update the fingerprint to incorporate changes so that normal operations can be restored. For each bank or credit union, there may be a unique fingerprint ID to configure how the virtual API interacts between the headless browser and the internet banking software. It may be possible for the virtual API system to load more than one fingerprint per application, theoretically enabling the native mobile banking application to directly access internet banking software for more than one bank or credit union on behalf of a user that has valid credentials at multiple institutions. This also enables the native mobile banking application to be independently branded and enables consumers to access any fingerprinted internet banking system. If configured in this manner, users may select their financial institution from among multiple fingerprinted organizations prior to initial login.

In some aspects, the native app uses the headless browser to send and receive information to and from the internet banking system through an established interface. Once a system for a bank or credit union is fingerprinted for use by a virtual API (e.g., an embedded API), the native app may provide access credential data, such as username, password, and any additional information needed to authenticate (e.g., multi-factor authentication code, etc.). The need to pass in additional authentication information would be determined by the headless browser parsing the initial response to the application passing in the username/password. If the website responds in a way that was previously fingerprinted as being associated with a multi-factor authentication request, the native app may prompt the user to enter such information, which may be obtained via an out-of-band channel, such as e-mail or text message. Similarly, if the website responds to an authentication attempt with a multi-factor authentication challenge, a fingerprint may indicate how to respond to such a challenge, and the native app may parse the challenge received through the virtual API so that the challenge can be relayed to the user in the GUI of the native app. The resulting response from the user would then be passed back through the virtual API into the headless browser and then relayed from the headless browser to the server/web server hosting the internet banking website.

Alternatively, the server/web server may reject/fail the authentication and provide an error status/page. In this scenario, the error/status page may have been pre-mapped and fingerprinted. The error status would be parsed and passed back to the native app by the virtual API for display to the user, so that the user can take action (e.g., by re-entering the correct information, etc.). The virtual API may thus function as a mapping of all potential interactions and responses between the website/web server/internet banking pages and the actions that the user can take in the native mobile banking application.

In some examples, additional data acquisition functions may take place with the virtual API and the headless browser that are not related to direct actions taken by the user. For example, once the user has authenticated, the native app, in the background, may make a series of virtual API requests through the headless browser that have the effect of triggering the internet banking server to display recent banking transactions. The native app can parse and store that information for future use, and this process can be done asynchronously from any user interaction with the native app. This same capability can be used to retrieve other account and transaction related information (e.g., transaction details, scanned check/deposit images, etc.), and can also be used to provide enhanced responsiveness to the user for account related activities. For example, in the GUI of the native app, the user may perform a transfer action which may take the internet banking server ten seconds to complete. The native app may perform other functions while the headless browser interacts with the internet banking server (e.g., website) and waits for a response that the transfer was finalized. In this example, if the transfer completes, the user may receive a confirmation notice in the GUI of the native app, or may not be notified (under the assumption that the transfer went through if there is no notification), thereby saving the user ten seconds and enabling the user to move on to another function. If the headless browser decodes a response that has been fingerprinted and is mapped by the virtual API to a failure or exception, this can trigger a notification to the user or enable the user to be taken back to the point in the native app where the user can attempt to correct the failure or exception.

Referring to element 3 of the fourth approach 240, the native mobile banking application may be branded for a specific bank or credit union and may be distributed in the app stores associated with various mobile platforms. These native mobile banking applications may be configured to offer users mobile-formatted user interfaces for accessing banking features. Features supported by internet banking and fingerprinted by the virtual API can be configured in the native mobile banking application. Additional mobile-only features, such as RDC or mobile wallet card enrollment, can be directly supported.

Referring to element 4 of the fourth approach 240, the headless browser may act as an integration layer that presents a unique, distributed, secure web browsing session in real-time or near-real-time to the internet banking system identified by the virtual API fingerprint. In contrast with the other approaches 210, 220, 230, access by the headless browser associated with the use of the native mobile banking application directly relates to authorized user activity on behalf of the financial institution and is identical in terms of access traffic to a mobile browser login originating from the same device. This has substantial security, performance, integration, operational and business benefits. By leveraging headless browser technology, the fourth approach 240 enables direct interaction in real-time or near-real-time for both "read" and "write" activity for a user's accounts without requiring a direct mobile integration interface (e.g., the direct mobile integration interface used in the first approach 210 or in the second approach 220). Multi-factor authentication challenges may be facilitated by session and cookie-handling of the headless browser, leveraging security protocols for internet banking that are already in place.

Referring to element 5 of the fourth approach 240, a standards-compliant SSL-encrypted web network connection may enable the native mobile banking application to interact as securely as any SSL-protected mobile web connection to a bank or credit union's internet banking system. Traffic between the internet banking software is encrypted and can only be decrypted by the headless browser session. Data and interactions from the native mobile banking application are packaged by the virtual API and passed back via the headless browser over this SSL-encrypted web network connection in a format defined by the fingerprint for the internet banking service.

Referring to element 6 of the fourth approach 240, internet banking software is web-based software, and, as such, may not have support for RDC (which requires access to a high-quality digital camera capture device, such as those on smartphones). RDC is a popular mobile banking feature, so in the fourth approach 240, RDC is natively supported in mobile banking application. Instead of requiring the bank or credit union to adopt dedicated RDC software for reviewing scanned check deposits, the fourth approach 240 may include direct integration with the teller check capture method that the bank or credit union uses for scanning check deposits at brick-and-mortar branch locations or ATMs. By tying into the existing high-volume check scanning system, the fourth approach may eliminate additional cost and complexity for the bank or credit union. The user interface for RDC, which may be branded for each financial institution, may be independent of the teller check capture system. In the fourth approach 240, RDC may involve providing image and transaction data to the teller check capture system in the format expected by the teller check capture system.

Referring to element 7 of the fourth approach 240, the encrypted secure network connection may use a vendor-specific teller check capture API interface that the bank or credit union would use when submitting checks for review and processing from remote branches or ATMs. This process may be secured by access credentials and API access keys specific for that bank or credit union. Referring to element 8 of the fourth approach 240, the teller check capture back-end software may be used by banks or credit unions that allows for automated processing of paper checks. The checks are converted to Check 21 compliant digital documents for review and processing. Check 21 compliant checks are compliant with United States federal law embodied in the Check 21 Act, also known as the Check Clearing for the 21st Century Act, enacted in 2003. Check 21 compliant systems may apply business rules to automate the acceptance or rejection of items based on identified document characteristics (such as valid amount or signature), or account-specific variables (such as overdraft history, risk scoring or available balance). The teller check capture systems may also integrate with core banking software. The conversion to Check 21 compliant digital documents is provided as a non-limiting example and the conversion may vary from country to country depending on local standards or regulations.

Referring to element 8 of the fourth approach 240, in some examples, an optional incumbent mobile banking platform may be present. Banks and credit unions may have existing mobile banking applications available for use by their customers. These applications may be of limited function, outdated, expensive, or otherwise limited. The fourth approach 240 may enable financial institutions to easily switch to native mobile banking apps, because the native mobile app of the present disclosure does not interact with the existing mobile banking platform. Banks or credit unions may opt to keep the existing mobile banking platform in place to service legacy users, or to meet contractual obligations to incumbent vendors, while using the technology of the present disclosure for other end users.

Thus, for a financial institution that has not yet deployed mobile banking software, the fourth approach 240 may be more secure, faster to implement, and more full-featured than any of the approaches 210-230. The above described advantages of the fourth approach 240 may incentivize financial institutions that have already deployed mobile banking software according to one of the approaches 210-230 to instead switch to the fourth approach 240.

It should be noted that unlike other systems which may utilize a headless browser, the techniques of the present disclosure do not execute the user interface in the headless browser and then translate a resulting experience to a client. Rather, the "client" native mobile app may have a fixed user interface that does not vary in presentation based on a server-side website. Instead, the client user interface may be defined at the point the native app is published to an app store. Moreover, in the techniques of the present disclosure, the headless browser is used to create a secure, standards-based browser session with internet banking, which can be considered an application-specific proxy server. Before the native app is published, a virtual API (e.g., an embedded API) configuration is created for a bank or credit union, and the virtual API configuration defines the internet banking functions available and the expected methods in HTML/JavaScript or other languages supported by the browser now or in the future for reading/writing that information to the internet banking site. This configuration may be different for different banks/credit unions and may correspond to items, such as username or password, transaction information, etc. Each such item may be pre-mapped in the configuration against the banking application API, which may be standardized across all branded "versions" of the native app. Thus, in some aspects, a particular native app may only be compatible for use on a specific website and/or a specific version of internet banking software. In the systems and methods of the present disclosure, the headless browser does not rely on translation between the website's interface and the banking app. Instead, the headless browser may be used as a secure pipe over an open network interface.

Figure 3:
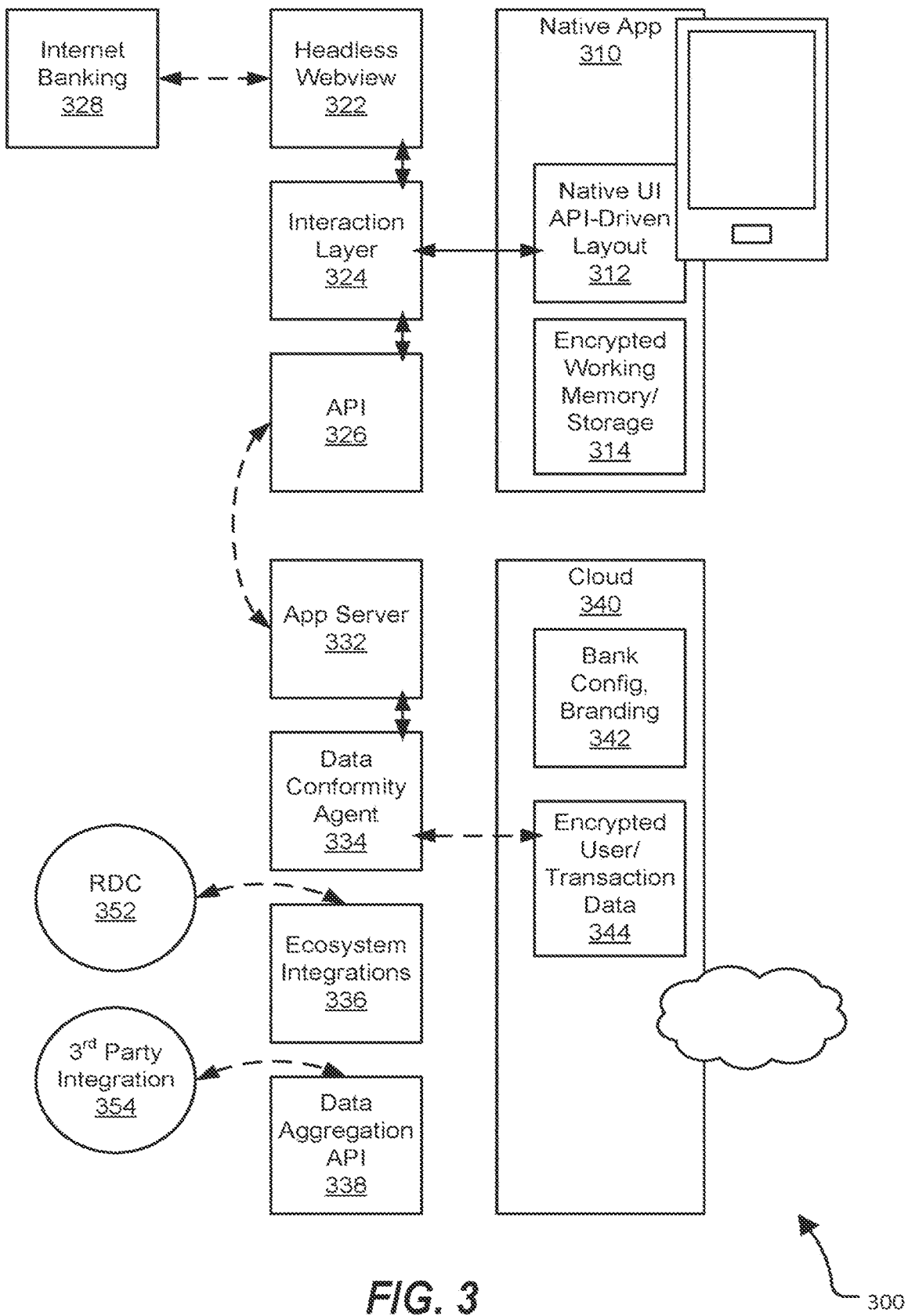
FIG. 3 is a diagram to illustrate another aspect of a system that supports secured data access from a mobile device executing a native mobile application and a headless browser.

Referring to FIG. 3, another illustrative aspect of a system 300 is shown. In particular, the system 300 corresponds to a high-level architectural diagram to illustrate technology that may be used to facilitate read and write access by a mobile device to secured data.

The system 300 includes a native app 310, which may function as described with reference to the native app 112 of FIG. 1 and the native banking app shown at element 3 of the fourth approach 240 of FIG. 4. The native app 310 may include a native user interface having an API-driven layout 312 and an encrypted working memory/storage 314.

The system 300 also includes a cloud component 340, which may correspond to one or more cloud servers. The cloud component 340 includes bank configuration and branding data 342 and encrypted user/transaction data 344.

To facilitate communication between the native app 310 and internet banking 328 (e.g., a bank website), the native app 310 may optionally utilize an interaction layer 324 to communicate with a headless web view 322 (e.g., the headless browser 114 of FIG. 1 or the headless browser shown at element 4 of the fourth approach 240 of FIG. 2). In another configuration (not shown), the headless browser/headless webview 322 communicates directly with the virtual API, in this case the API 326. Thus, the various interactions would occur between the API 326 and the headless webview 322.

The native app 310 may also communicate with an application server 332 via an API 326. In a particular aspect, the API 326 corresponds to the virtual API (e.g., the embedded API) described with reference to FIGS. 1-2. The virtual API can also access other APIs the native application may require access to along with the functionality provided by accessing the internet banking system through the headless browser. The cloud component 340 may also communicate with a data conformity agent 34, as shown. RDC 352 and third-party integration 354 may be accessible via ecosystem integrations 336 and a data aggregation API 338, respectively. For example, the application server 332, the data conformity agent, the integrations 336, and the data aggregation API 338 may enable functions that are not typically available via internet banking, such as contactless ATM authentication, peer-to-peer fund transfer, etc., as described with reference to FIGS. 1-2.

Figure 4:
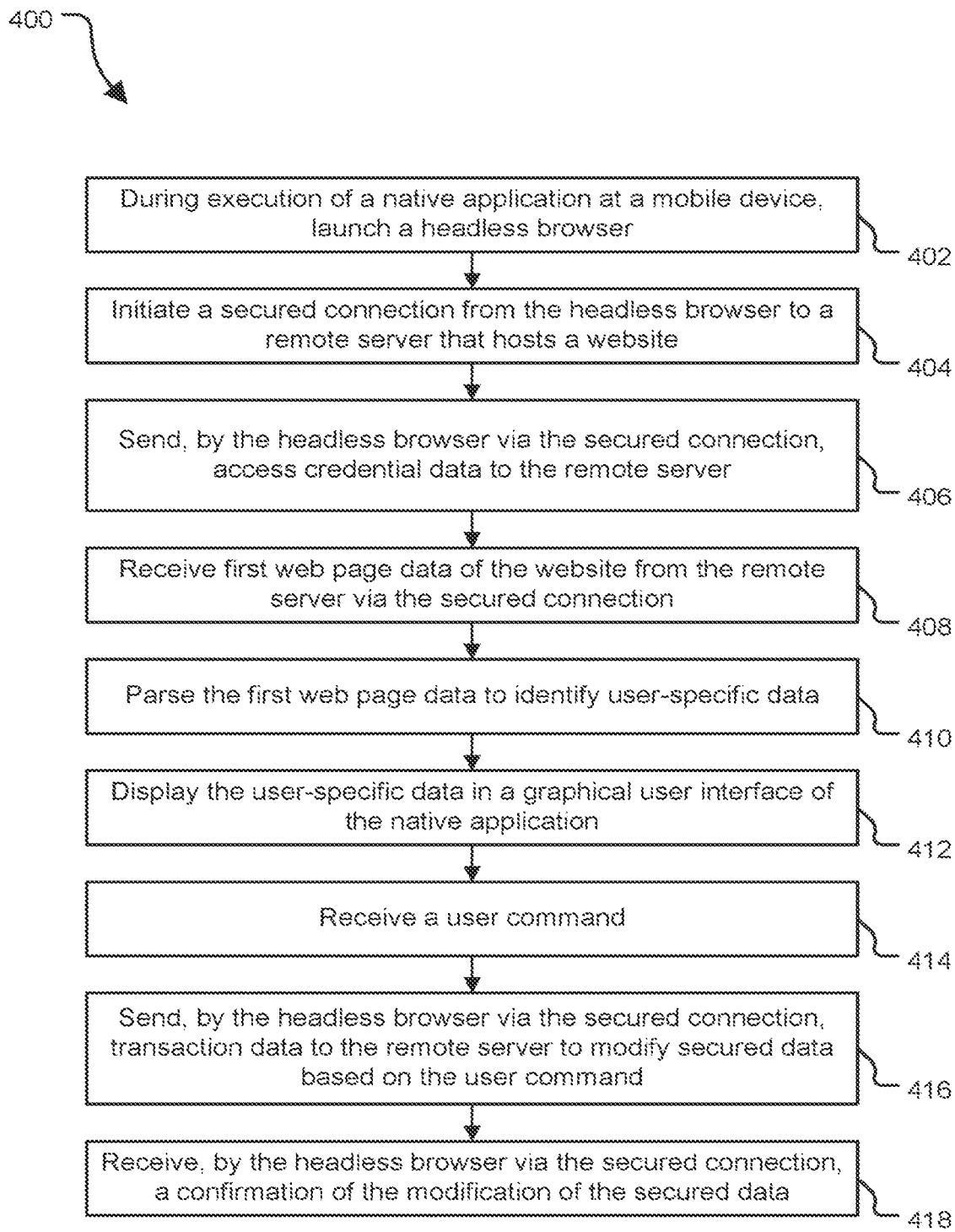
FIG. 4 is a flowchart to illustrate an exemplary method of operation at a mobile device.

Referring to FIG. 4, an illustrative aspect of a method 400 of operation at a mobile device is shown. In particular examples, the method 400 may be performed by the mobile device 110 of FIG. 1, a mobile device implementing the integration-free third party mobile banking solution described with reference to the fourth approach 240 of FIG. 2, or a mobile device executing the native app 310 of FIG. 3.

The exemplary method 400 includes, during execution of a native app at a mobile device, launching a headless browser, at 402. The method 400 also includes initiating a secured connection from the headless browser to a remote server that hosts a website, at 404. The method 400 further includes sending, by the headless browser via the secured connection, access credential data to the remote server, at 406. Continuing to 408, the method 400 includes receiving first web page data of the website from the remote server via the secured connection. The method 400 includes parsing the first web page data to identify user-specific data, at 410, and displaying the user-specific data in a GUI of the native app, at 412. The method further includes receiving a user command, at 414, and sending, by the headless browser via the secured connection, transaction data to the remote server to modify secured data based on the user command, at 416. The method includes receiving, by the headless browser via the secured connection, a confirmation of the modification of the secured data, at 418. The method 400 may thus enable a native app on a mobile device to access secured data using a headless browser, which may provide faster performance and/or an improved user experience as compared to a non-native app or requiring the user to open a mobile browser to manually access a website.

Figure 5:
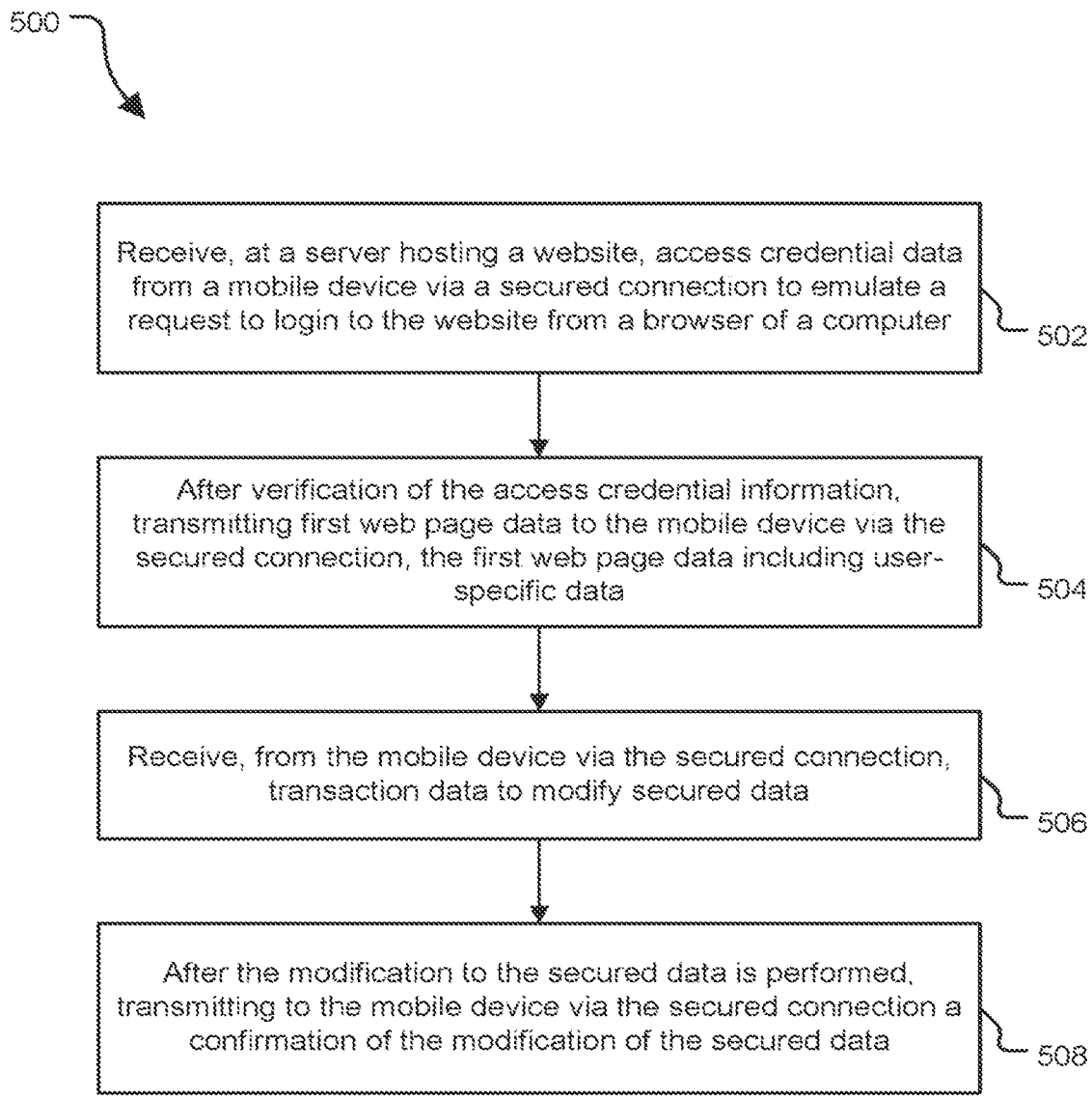
FIG. 5 is a flowchart to illustrate an exemplary method of operation at a server.

Referring to FIG. 5, an illustrative aspect of a method 500 of operation at a server is shown. In particular examples, the method 500 may be performed for example by the web server 130 of FIG. 1, a server hosting the internet banking software shown at element 1 of the fourth approach 240 of FIG. 2, and/or a server hosting the internet banking 328 of FIG. 3.

The method 500 includes receiving, at a server hosting a website, access credential data from a mobile device via a secured connection to emulate a request to login to the website from a browser of a computer, at 502. The method 500 also includes, after verification of the access credential information, transmitting first web page data to the mobile device via the secured connection, the first web page data including user-specific data, at 504. The method 500 further includes receiving, from the mobile device via the secured connection, transaction data to modify secured data, at 506. The method 500 includes, after the modification to the secured data is performed, transmitting to the mobile device via the secured connection a confirmation of the modification of the secured data, at 508.

It is to be understood that in alternative aspects, one or more steps of the methods 400, 500 of FIGS. 4-5 may be performed in a different order, may be combined or performed at least partially concurrently, or may be omitted. Further, one or more other steps may be added. As an example of steps that may be added, a virtual API step may be added between the headless browser and the native app to make access to different websites in a uniform way, i.e., different banking internet websites Referring to FIG. 6, an illustrative example of a mobile device 602 is shown. The mobile device 602 may be configured to perform one or more of the functions and methods described above with reference to FIGS. 1-5.

The mobile device 602 includes a computer-readable storage device 606, one or more processors 608 (e.g., a central processing unit (CPU), a digital signal processor (DSP), a graphics processing unit (GPU), etc.) and a memory 610. The storage device 606 may be implemented as read-only memory (ROM), random access memory (RAM), and/or persistent storage, such as a hard disk drive, a flash memory device, or other type of storage device. The memory 610 is configured to store instructions 612 executable by the processor 608 to perform one or more of the functions or methods described above with reference to FIGS. 1-5. The computer-readable storage device 606 is not a signal.

Figure 6:
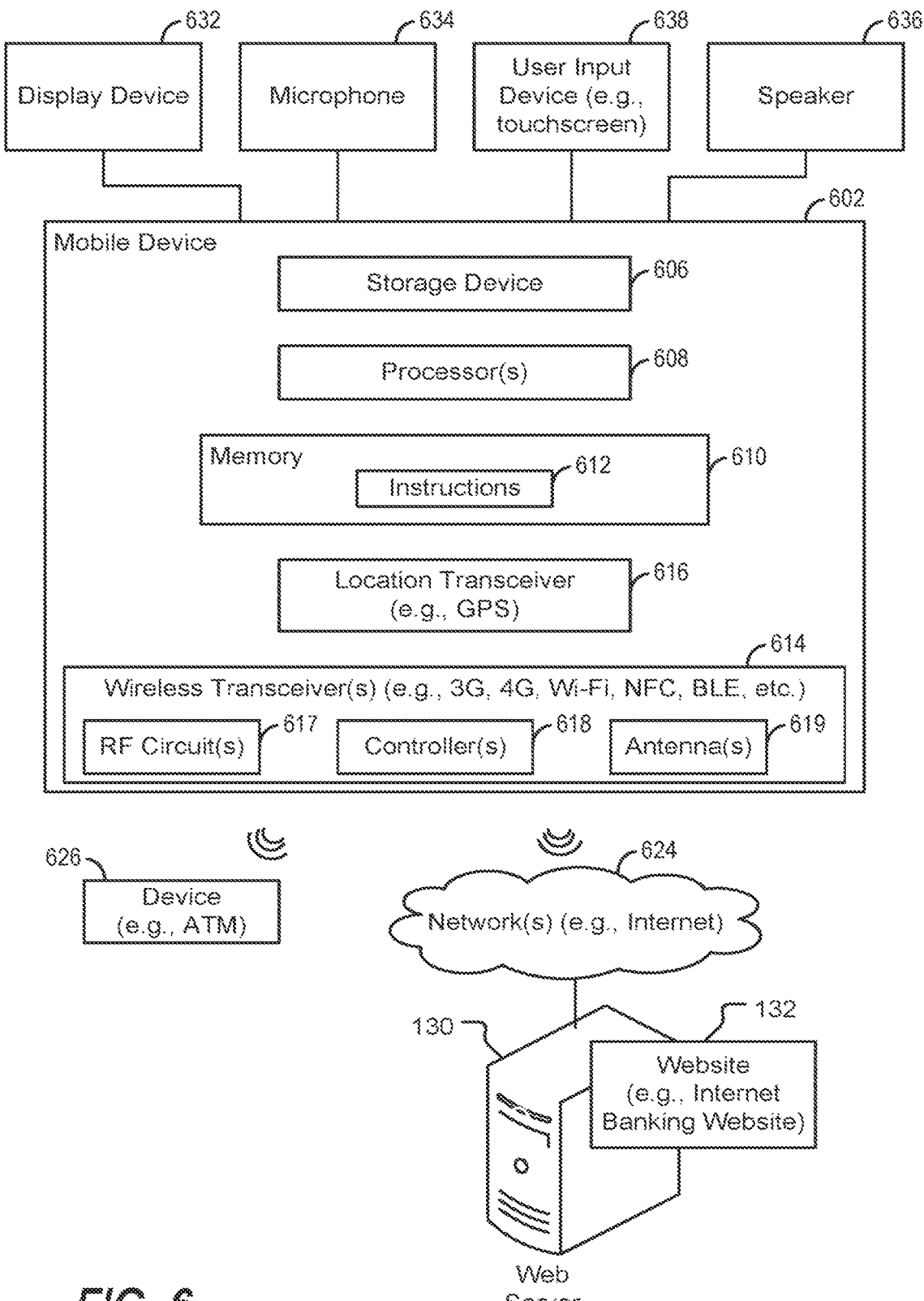
FIG. 6 is a block diagram of an illustrative aspect of a mobile device operable to support methods, apparatuses, and computer-readable storage devices disclosed herein.

The mobile device 602 also includes a location device 616 (e.g., a GPS transceiver) and one or more wireless transceivers 614 that enable the mobile device 602 to exchange signals with (e.g., receive signals from and/or send signals to) other devices. Each wireless transceiver 614 may include or be coupled to radio frequency (RF) circuitry 617, a controller 618, and/or an antenna 619. In illustrative examples, the wireless transceivers 614 include a third generation (3G) transceiver, a fourth generation (4G) transceiver, a fifth generation (5G) transceiver, a Wi-Fi transceiver, a near field communication (NFC) transceiver, a BLUETOOTH (BLUETOOTH is a registered trademark of Bluetooth SIG, Inc. of Kirkland, Washington, USA) or BLUETOOTH® low energy (BLE) transceiver, or any combination thereof. In the example of FIG. 6, the mobile device 602 is configured to utilize one or more of the wireless transceivers 614 for direct peer-to-peer communication and communication via one or more networks 624, such as the internet. To illustrate, the mobile device 602 may communicate with an external device 626 (e.g., an automated teller machine (ATM) for contact-less ATM authentication) via a peer-to-peer wireless channel (e.g., BLUETOOTH, BLE, or NFC) and may communicate with the web server 130 hosting the website 132 via a cellular or Wi-Fi wireless channel.

In the example of FIG. 6, the mobile device 602 includes or is coupled to input devices and output devices. For example, the mobile device 602 may include or may be coupled to a display device 632, a microphone 634, a speaker 636, and/or a user input device 638 (e.g., a touch-screen). It should be noted that, while illustrated as outside of the mobile device 602, one or more of the devices 632-638 may be integrated into a housing of the mobile device 602, such as in the case of a mobile phone or tablet computer.

Although API fingerprint data has been described as being stored at a server and accessed by a mobile device, in some implementations, the API fingerprint data is generated by the mobile device as part of a process to access a website. To illustrate, a user may enter a name of a financial institution into the native app. The native app accesses a directory server and request API fingerprint data corresponding to the financial institution. If a match is found, the directory server provides the API fingerprint data to the mobile device, and the native app uses the API fingerprint data to establish a secure connection, via a headless browser, with the website. Once the secure connection is established, the native app interacts with the website to enable read and write access to secured data, such as accounts data, in addition to operations, such as online bill pay, account transfers, withdrawals, or deposits, as non-limiting examples.

If no match is found, the mobile app generates the API fingerprint data at the mobile device. For example, the native app may perform screen scraping operations to identify one of more of the elements of the website and to determine locations of the one or more elements. To further illustrate, the native app performs screen scraping, web scraping, or other operations described further herein, on a particular web page, such as a login page of a website, to identify elements of the particular web page and locations of the elements within the particular web page. In a particular implementation, the locations are represented by coordinates with respect to the particular web page. After identifying the elements (and locations of the elements within the web page), the native app generates API fingerprint data that maps the elements of the website to elements of the mobile app, such as username inputs, password inputs, login buttons, account balances, bill pay buttons, other elements, or a combination thereof. After generating the API fingerprint data, the mobile device sends the API fingerprint data to the directory server for storage and later use (e.g., by the mobile device or by another mobile device that executes the native app). In this manner, as new institutions are identified, API fingerprint data may be generated "on the fly" by mobile devices. Because the accessing and parsing operations are performed by mobile devices of customers (e.g., banking customers) and not by a centralized server, it may be more difficult or undesirable for an institution to block the mobile devices from performing the operations. Once the API fingerprint data is generated, the native app (on the same mobile device or being executed on a mobile device of a different customer) may use the API fingerprint data to login to a website and to enable read and write access to secure data. For example, responsive to receiving a user command, such as a command to transfer funds between two accounts, the native app sends transaction data to the website to cause modification of the secure data to effectuate the user command. As further described herein, the transaction data includes information such as a first account number and a second account number in addition to a command to transfer a particular amount of money from the first account to the second account, as a non-limiting example. Because the transaction data is generated in accordance with the API fingerprint data (e.g., the transaction data is mapped from elements of the native app to elements of the website), the transaction data appears, from the perspective of the remote server hosting the website, to be normal transaction data that would be sent by a desktop computer that accesses the website. Thus, the mobile device (executing the native app) emulates a login and access from a desktop computer for which the website is designed to operate with.

Figure 7:
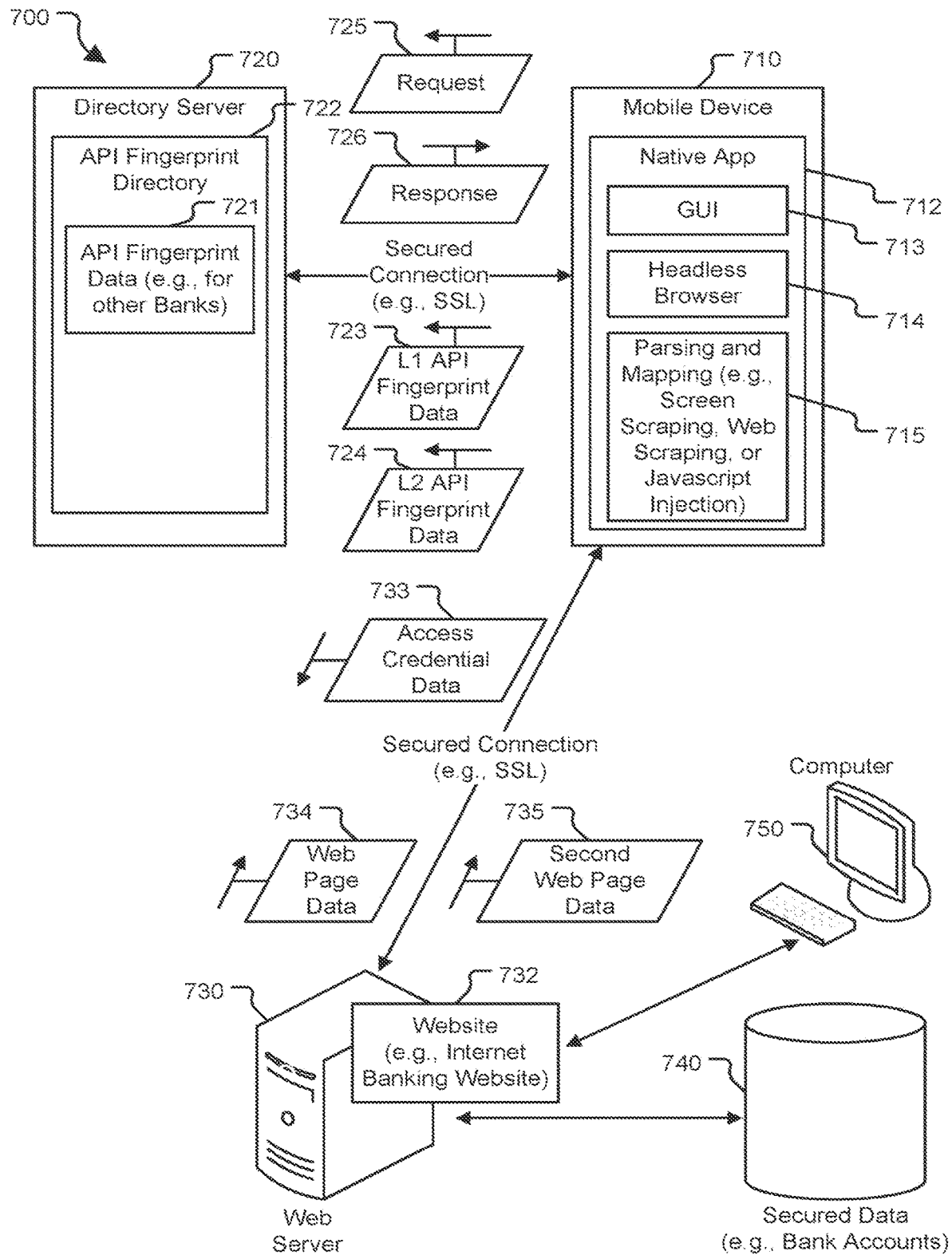
FIG. 7 is a diagram of an illustrative aspect of a system that supports generation of application programming interface (API) fingerprint data at a mobile device executing a native mobile application and a headless browser.

Referring to FIG. 7, an illustrative aspect of a system is shown and generally designated 700. The system 700 includes a mobile device 710, such as a mobile phone, a tablet computer, a personal digital assistant, a wearable computing device, a portable media player, a computing device of a vehicle, etc. The mobile device 710 includes a memory that stores processor-executable instructions and data corresponding to one or more applications ("apps"). For example, the mobile device 710 may include a native app 712.

In some examples, the native app 712 may be a version of a mobile banking application that is specific to a financial institution, such as a specific bank or a specific credit union. In a particular aspect, the mobile device 710 (in response to a user request) downloads the native app 712 from an app storefront. In some examples, the native app 712 is generated based on a generic native app template by adding branding components, such as names, logos, color schemes, typeface schemes, etc. For mobile banking, the native app 712 may be configured to perform online banking operations such as an account balance operation, a fund transfer operation, a credit card payment operation, a deposit operation, a withdrawal operation, a bill pay operation, a transaction history operation, etc. Although described in the context of online banking, in other implementations, the native app 712 is used to access any type of secured data stored at a website.

The system 700 also includes a web server 730 located remote to the mobile device 710. The web server 730 (which may correspond to multiple web servers in alternative examples) may be configured to host a website 732. In particular examples, the website 732 is an internet banking website. In some aspects, the website 732 is a "desktop" version of an internet banking website. To illustrate, the website 732 may deliver content that is formatted for presentation on a desktop computer or laptop computer, rather than a mobile version of such content that is formatted for presentation on a mobile device. Thus, in some aspects, the website 732 is typically used by users at computers, such as an illustrative computer 750, to log in to a financial institution and perform internet banking functions. In other aspects, the website 732 may have content formatted for presentation on a mobile browser. The website 732 enables a user of the computer 750 to access secured data 740, such as information regarding the user's bank accounts. As another example, the website 732 enables a user of the computer 750 to view account balances, transaction histories, and credit card information. As yet another example, the website 732 enables a user of the computer 750 to transfer funds between accounts.

During operation, the mobile device 710 may use the website 732 to access the secured data 740, even if the website 732 includes content that is not formatted for mobile devices. To illustrate, the native app 712 may launch a headless browser 714 to enable communication with the website 732. The headless browser 714 does not include a GUI displayed to a user, although the native app 712 may have a GUI 713 displayed to a user. As further described herein, the native app 712 may access API fingerprint data that maps elements of the website 732 to elements of the native app 712 to enable the native app 712 to display content that is formatted for the mobile device 710, regardless of whether the content of the website 732 is formatted for the mobile device 710. For example, the content displayed via the GUI 713 of the native app 712 may have a "look and feel" similar to other applications of the mobile device 710, such as an underlying look and feel associated with an operating system of the mobile device 710. To illustrate, in a particular implementation, the native app is designed such that one or more buttons, icons, graphics, or text have a similar format to buttons, icons, graphics, or text associated with the underlying operating system. Additionally, or alternatively, the GUI 713 may include particular branding or other material that associates the native app 712 with a particular company (e.g., a mobile banking app providing company, as a non-limiting example).

In accordance with the techniques of the present disclosure, a user may enter a name of a financial institution using the mobile device 710. In some implementations, the name may be a partial name, such as "Fifth National Bank" when the full name is "Fifth National Bank of Austin." The native app 712 accesses a directory server 720 to determine if application programming interface (API) fingerprint data is stored at the directory server 720 for the user-entered financial institution. For example, the native app 712 causes the mobile device 710 to send a request 725 to the directory server 720. The request 725 is for API fingerprint data associated with the name entered by the user. The native app 712 may access the directory server 720 via a secured connection. For example, the secured connection may be a secure sockets layer (SSL) connection from the mobile device 710 to the directory server 720.

The directory server 720 stores an API fingerprint directory 722 that includes API fingerprint data 721 for one or more financial institutions. The API fingerprint data 721 indicates a mapping between one or more websites and the native application. For example, the API fingerprint data for a particular webpage indicates mappings between features of the particular webpage and one or more elements (buttons, fields, screens) of a GUI 713 of the native app 712. The API fingerprint data 721 for the particular webpage also identifies an address of the particular webpage. The API fingerprint data 721 may also include a "fingerprint" of the internet banking service pathways used for a user to log in, authenticate, and take other actions possible with internet banking. The API fingerprint data 721 is used to form a "virtual API" between the native app 712 and the particular website (e.g., even though there is no actual API between the native app 712 and the particular website). For example, the API fingerprint data 721 enables the native app 712 to communicate with fingerprinted websites as though the native app 712 was designed for use with the websites. Although referred to as a virtual API, the "virtual" API is an actual API that interfaces between the native app 712 and the particular website, as further described herein.

If the directory server 720 stores API fingerprint data for the financial institution identified by the request 725, the API fingerprint data is returned to the mobile device 710 for use in connecting to the website 732, as further described with reference to FIG. 9. Alternatively, if no API fingerprint data has been found, the directory server 720 sends a response 726 to the mobile device 710 indicating that no API fingerprint data has been found based on the name of the financial institution. In response to receiving the response 726, the native app 712 may provide a prompt for an address of the website via the GUI 713 of the native app 712. For example, the GUI 713 may display a prompt indicating that the name of the financial institution was not recognized in addition to requesting an address (e.g., a uniform resource locator (URL) address) of a webpage associated with the financial institution. After receiving a second user input that identifies the address, such as via a touchscreen, speech recognition, or other user input device, the native app 712 initiates a connection with the website 732 using the headless browser 714.

In some implementations, the native app 712 utilizes the headless browser 714 as a proxy. To illustrate, the native app 712 may use the headless browser 714 to emulate a request to login to the website 732 from a non-headless browser, such as a browser of a computer (e.g., the computer 750) in the case of a desktop internet banking website, or a browser of the mobile device 710 in the case of a mobile internet banking website. Thus, to the website 732, the login performed utilizing the headless browser appears as though the login came from a browser for which the website 732 was designed. Even if the website has versions for both mobile and desktop, when accessing the website from the headless browser in the mobile device, the desktop version may be used in favor of the mobile version based on factors such as functionality provided, simplicity, etc.

To perform the login, the native app 712 initiates a secured connection from the headless browser 714 to the website 732 and sends access credential data 733 to the website 732. For example, the secured connection may be a secure sockets layer (SSL) connection between the web server 730 and the mobile device 710, and the native app 712 may send a username and password via SSL to the website 732 using the headless browser 714. To illustrate, the native app 712 causes the headless browser 714 to access a login page of the website 732. For example, the headless browser 714 may connect to the address identified by the second user input. In response to accessing the login page of the website 732, the native app 712 receives web page data 734 from the web server 730. The web page data 734 includes data of the login page associated with the website 732. The web page data 734 is received at the mobile device 710 via the secured connection.

The native app 712 receives the web page data 734 and parses the web page data to identify locations of one or more elements of the website (e.g., of the login page). For example, the native app 712 may include a parsing and mapping unit 715 configured to perform parsing on web page data to identify various elements, and locations thereof, within the web page data. The elements include items (e.g., boxes, fields, etc.) associated with a username, a password, a login button, or a combination thereof. The elements are identified such that mappings between the elements and one or more elements of the native app 712 can be determined.

The elements are identified using one or more webpage analysis operations. For example, the native app 712 may be configured to perform a screen scraping operation and/or web scraping operation on the web page data 734 to determine the location of the one or more elements. As another example, the native app 712 may be configured to perform Javascript injection operation on the web page data 734 to determine the location of the one or more elements. In other implementations, programs in other languages that are interpretable by a web browser are used. As another example, the native app 712 may be configured to perform a document object model (DOM) inspection operation on the web page data 734 to determine the location of the one or more elements.

To illustrate, in a particular implementation, the native app 712 performs DOM inspection operations on the web page data 734 to identify locations of the one or more elements. For example, the DOM representation of the web page data 734 may indicate locations of various elements, and DOM inspection may facilitate discovery of the locations. In another particular implementation, during the sign-on procedure, the client-side code is monitored to determine locations of elements, functions that are called during the process, structures that are read or accessed during the process, or a combination thereof. For example, the client-side code may include Javascript that calls certain functions and reads certain structures as part of the logon process. In this implementation, the functions and/or the structures are mapped to corresponding functions and/or structures of the native app 712. In another particular implementation, back-end accesses performed by the website are monitored. For example, the back-end API between the website 732 and the web server 730 may be monitored if such interface is visible through inspection (e.g., source code inspection, parsing, screen/web scraping, DOM inspection, etc.). In this implementation, interactions between the website 732 and the web server 730 are mapped to HTTP GET or HTTP POST commands, as non-limiting examples.

After determining the locations of the one or more elements, the native app 712 generates level 1 (L1) API fingerprint data 723. The L1 API fingerprint data 723 indicates a mapping between the one or more elements of the login page of the website 732 and the native app 712. For example, the L1 API fingerprint data 723 may indicate a location of an element, a type of the element, other information associated with the element, or a combination thereof. As a particular example, the L1 API fingerprint data 723 may identify a location of a username field, a type (e.g., input field), and that the field corresponds to a username. As another particular example, the L1 API fingerprint data 723 may identify a location of a password field, a type (e.g., input field), and that the field corresponds to a password. As yet another example, the L1 API fingerprint data 723 may identify a location of an enter button, a type (e.g., button), and that the button corresponds to entering the username and the password. In some implementations, the L1 API fingerprint data 723 also indicates service pathways used during a multi-factor authentication, if such authentication is used to enable access to the website 732. The L1 API fingerprint data 723 also includes the address (e.g., the URL address) of the website 732, or a particular page, such as a login page.

Figure 8:
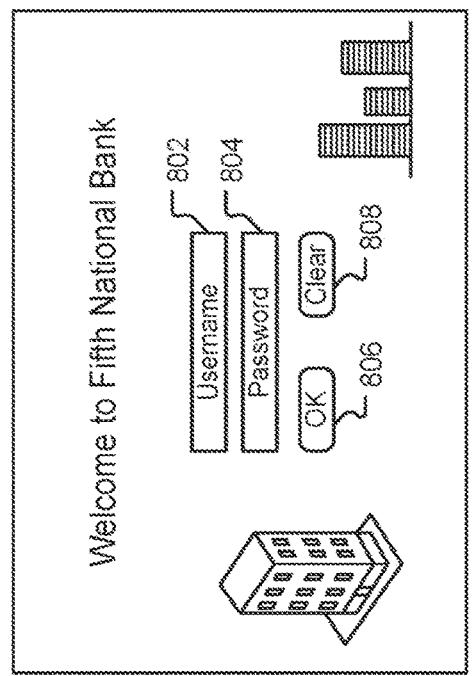
FIG. 8 is a diagram of web pages and API fingerprint data in accordance with FIG. 7.

FIG. 8 illustrates examples of web pages and API fingerprint data. For example, FIG. 8 illustrates a first web page 800 and a second web page 810. In the example of FIG. 8, the first web page includes or corresponds to a login page of an online banking website associated with a financial institution, and the second web page 810 includes or corresponds to a balance page of the online banking website. The first web page 800 includes one or more elements, including a username input box 802, a password input box 804, an OK button 806, and a clear button 808. The second web page 810 includes one or more elements, including a checking account balance 812, a checking account transfer button 814, a checking account view button 816, a savings account balance 818, a savings account transfer button 820, and a checking account view button 822. The second web page 810 also includes a pay button and a view button for online bill paying in addition to a credit card balance, a pay button, and a view button for a credit card associated with the financial institution. The illustrative websites displayed in FIG. 8 are not limiting and, in other implementations, the websites include fewer elements, more elements, or different elements. FIG. 8 also illustrates first API fingerprint data 830 associated with the first web page 800. The first API fingerprint data 830 includes an address of the first web page 800 and a mapping of elements of the first web page 800. For example, the first API fingerprint data may identify an element name, an element type, a location, or a combination thereof, of each of the one or more elements that map to elements of the native app 712. In the example illustrated in FIG. 8, the first API fingerprint data 830 includes an identification of a username element, an indication that a type of the element is an input_box, and a location of the element (or a particular point, such as a reference point, of the element within the first web page 800). Similarly, second API fingerprint data 832 is associated with the second web page 810. The second API fingerprint data 832 includes an address of the second web page 810 and a mapping of elements of the second web page 810 to elements of the native app 712. For example, the native app 712 may include elements for checking account balance and buttons, savings account balance and buttons, credit card balance and buttons, and/or online bill pay buttons. The elements of the native app 712 are mapped to elements of the second web page 810. For example, the second API fingerprint data 832 may identify an element name, an element type, a location, or a combination thereof, of each of the one or more elements that map to elements of the native app 712. Although illustrated as two sets of API fingerprint data, in some implementations, the two sets make up a single API fingerprint of multiple web pages of a website. In a particular implementation, the API fingerprint data of FIG. 8 is generated by performing DOM inspection on the first web page 800 and the second web page 810. In other implementations, other API fingerprint data may be generated. For example, API fingerprint data may be generated by inspecting the client-side code of the first web page 800 and the second web page 810, and the API fingerprint data may include mappings for function calls or structures that are accessed. As another example, the API fingerprint data may be generated by monitoring back-end accesses and a back-end API based on the first web page 800 and the second web page 810, and the API fingerprint data may map certain elements to performance of an HTTP GET command or and HTTP POST command, an XMLHttpRequest (XHR) request, or an Asynchronous Javascript and XML (Ajax) request, as non-limiting examples.

Referring to FIG. 7, in an exemplary implementation, a user of the native app 712 is offered the chance to opt into the process of generating API fingerprint data. Opting in includes enabling the native app 712 to use the access credential data 733 to access one or more pages of the website 732. The access credential data 733 is encrypted and stored at the mobile device 710 during this process, and the access credential data 733 is deleted upon completion of the process. Additionally, push notifications may be provided to the user by the native app 712 to indicate that the user may receive multi-factor authentication messages as part of the process. For example, the push notifications may indicate that a particular access credential is being provided by an e-mail, a text message, or a phone call, as non-limiting examples. After receiving the particular access credential (such as a one-time code), the user may enter the access credential using the mobile device 710. In this manner, the user interacts with the native app 712 during the process of generating the L1 API fingerprint data 723.

After generating the L1 API fingerprint data 723, the native app 712 sends the L1 API fingerprint data 723 to the directory server 720 for storage. The directory server 720 stores the L1 API fingerprint data 723 at the API fingerprint directory 722. This enables mobile devices to be able to access the L1 API fingerprint data 723 without having to generate the L1 API fingerprint data 723 "on the fly." Because the L1 API fingerprint data 723 does not include any of the access credential data 73 3, the L1 API fingerprint data 723 may be shared by multiple mobile devices without creating security issues.

The native app 712 may use the L1 API fingerprint data 723 to embed an API in the headless browser 714 to enable an interface between the native app 712 and the website 732. In a particular implementation, the API is embedded using Javascript injection. For example, Javascript corresponding to the API (e.g., based on the L1 API fingerprint data 723) is injected into code of the website 732 via the headless browser. In other implementations, other languages may be used. As a non-limiting example, WebAssembly may be used to embed the API, allowing the injection of C, C++, or Rust API code in the headless browser 714. In this manner, the "virtual" API represented by the API fingerprint data is an actual API with services or methods provided in the native language of the platform to the native application and the implementation of the services or methods embedded at least partially within the headless browser 714.

Additionally, the native app 712 uses the L1 API fingerprint data 723 to access the website 732. For example, the native app 712 causes the GUI 713 to display elements that enable a user to enter a username and a password. The native app 712 may send the username and password to the website 732 via the headless browser 714, such as by using HTTP GET/POST commands or other commands. In some examples, the access credential data 733 is received via a user input device of the mobile device 710, such as a touchscreen or via voice commands. Alternatively, the access credential data 733 may be retrieved from a memory of the mobile device 710.

The web server 730 receives the access credential data 733 from the native app 712 for verification. To illustrate, the web server 730 may include software configured to compare the access credential data 733 to previously-stored access credential data. Alternatively, the web server 730 may forward the access credential data 733 to an authentication server. After the access credential data 733 is verified, the web server 730 transmits second web page data 735 to the headless browser 714. The second web page data 735 corresponds to the web page of the website 732 that would be sent to the computer 750 after a user of the computer 750 completed a login process of the website 732. Thus, the second web page data 735 may include user-specific data, such as the user's name, the user's account number(s), account balance(s), and/or other information corresponding to one or more of the user's checking accounts, savings accounts, credit card accounts, money market accounts, loan accounts, investment accounts, etc.

The native app 712 parses the second web page data 735 to identify the user-specific data and renders such user-specific data for display on the GUI 713 of the native app 712. To illustrate, the native app 712 may include the parsing and mapping unit 715 configured to parse the second web page data 735. Parsing the second web page data 735 may identify user-specific information, such as the user's name, account number(s), account balance(s), and other information. In addition, the native app 712 may parse the second web page data 735 to identify locations of one or more transactional elements. The one or more transactional elements include elements that enable mobile banking functionality, such as elements that enable online bill paying functionality, online account transfer functionality, online deposit or withdrawal functionality, other functionality, or a combination thereof. The native app 712 generates level 2 (L2) API fingerprint data 724 indicating a mapping between one or more transactional elements of the website 732 and one or more transactional elements of the native app 712. Based on the L2 API fingerprint data 724, the native app 712 may send transaction data to the website 732 to enable performance of one or more transactions, as further described with reference to FIG. 9. Although the API fingerprint data is described as being divided into two "levels" (e.g., L1 and L2), such division is not limiting. In other implementations, API fingerprint data for a particular website is not divided, or is divided in other manners.

Although described in the context of failing to find matching API fingerprint data, the system 700 may also generate new API fingerprint data in response to detecting an error condition with a login or with performance of a transaction. To illustrate, a bank may change a login page or may change one or more elements of various pages at various times, and such changes may trigger an updating process at the mobile device 710. For example, the native app 712 may attempt to login based on the L1 API fingerprint data 723 and the access credential data 733. In response to detecting an error condition, the native app 712 sends a request for other valid API fingerprint data to the directory server 720. If other API fingerprint data is associated with the particular bank, that API fingerprint data is provided from the directory server 720 to the mobile device 710. Alternatively, common API fingerprint data (e.g., API fingerprint data that matches multiple different banks) may be provided from the directory server 720 to the mobile device 710. To illustrate, because many online banking websites have the same underlying software, a set of API fingerprint data corresponding to the software may be used for multiple online banking websites. This "common" API fingerprint data may be provided by the directory server 720 to the mobile device 710 in response to a request for additional API fingerprint data. The native app 712 uses the additional API fingerprint data to attempt to login to the website 732. If the attempted login fails, the native app 712 may parse (e.g., perform screen scraping on) web page data of the login page to determine updated L1 API fingerprint data, which is sent to the directory server 720 for storage (and verification). Similar operations are performed for generating updated L2 API fingerprint data if online bill pay or other transactional operations, a post-login web page, or a combination thereof, are changed for the website 732.

It will be appreciated that by emulating a computer login to the website 732 and displaying user-specific information in the GUI 713, the native app 712 (using the headless browser 714) enables read access to the secured data 740 by a user of the mobile device 710. The techniques of the present disclosure are not limited to read-only access. For example, during operation of the native app 712, the native app 712 may receive a user command, such as a command to transfer funds between two accounts, as an illustrative non-limiting example. In response, the headless browser 714 sends transaction data to the website 732 via a secured connection, as further described with reference to FIG. 9, where the transaction data indicates a modification to be made to the secured data 740. For example, the transaction data 736 may correspond to HTTP command(s) that would be issued by the computer 750 when requesting a funds transfer operation on the website 732. Thus, from the perspective of the website 732, there is no difference between transaction data originating from a computer and the transaction data 736 sent by the headless browser 714 at the mobile device 710. Upon receiving the transaction data, the web server 730 takes actions to modify the secured data 740 (e.g., may initiate the funds transfer operation).

The system 700 of FIG. 7 thus enables automatic generation of API fingerprint data for use in connecting mobile devices to various websites, such as internet banking websites. Because the native app 712 is configured to generate the API fingerprint data "on the fly" (e.g., during a process of logging into and interacting with a website), the native app 712 is able to interact with websites for which API fingerprint data is not stored at the directory server 720 prior to an attempt to login to the websites. For example, the API fingerprint directory 722 at the directory server 720 may store API fingerprint data for a preset group of online banking websites. Because online banking websites for many banks are based on a small number of different online banking systems, the preset group of API fingerprint data may be sufficient to cover a large percentage of online banking web sites. For websites that are not covered by the preset API fingerprint data, the native app 712 generates API fingerprint data during a process of accessing the banking website. The API fingerprint data is stored at the directory server for later use. The architecture shown in FIG. 7 may thus enable the native app 712 to perform online banking services for a plurality of financial institutions, whether or not API fingerprint data for the plurality of financial institutions is stored at the directory server 720. Additionally, because the native app 712 is executed at the mobile device 710 of a customer, it may be difficult or undesirable for the financial institutions to block access by the mobile device 710, as compared to if the operations were performed at a centralized server.

Although the operations of FIG. 7 have been described as being performed at the mobile device 710, in other implementations, some of the operations are performed at a centralized server, such as the directory server 720. For example, in response to a determination that API fingerprint data matching the website 732 is not found at the directory server 720, the native app 712 may encrypt and provide the access credential data 733 (e.g., a username, a password, etc.) to the directory server 720. In these implementations, the directory server 720 temporarily stores the encrypted access credential data 733 and uses the access credential data 733 to access the website 732. During the process of accessing the website 732, the directory server 720 may perform screen scraping, Javascript injection or other supported language interpreted by a web browser, DOM inspection, other types of operations to determine locations of elements of the website 732, or a combination thereof, as part of a process to generate the L1 API fingerprint data 723 and the L2 API fingerprint data 724. Moving the generation of the API fingerprint data from the mobile device 710 to the directory server 720 may reduce complexity and resource use of the native app 712 at the mobile device 710.

Figure 9:
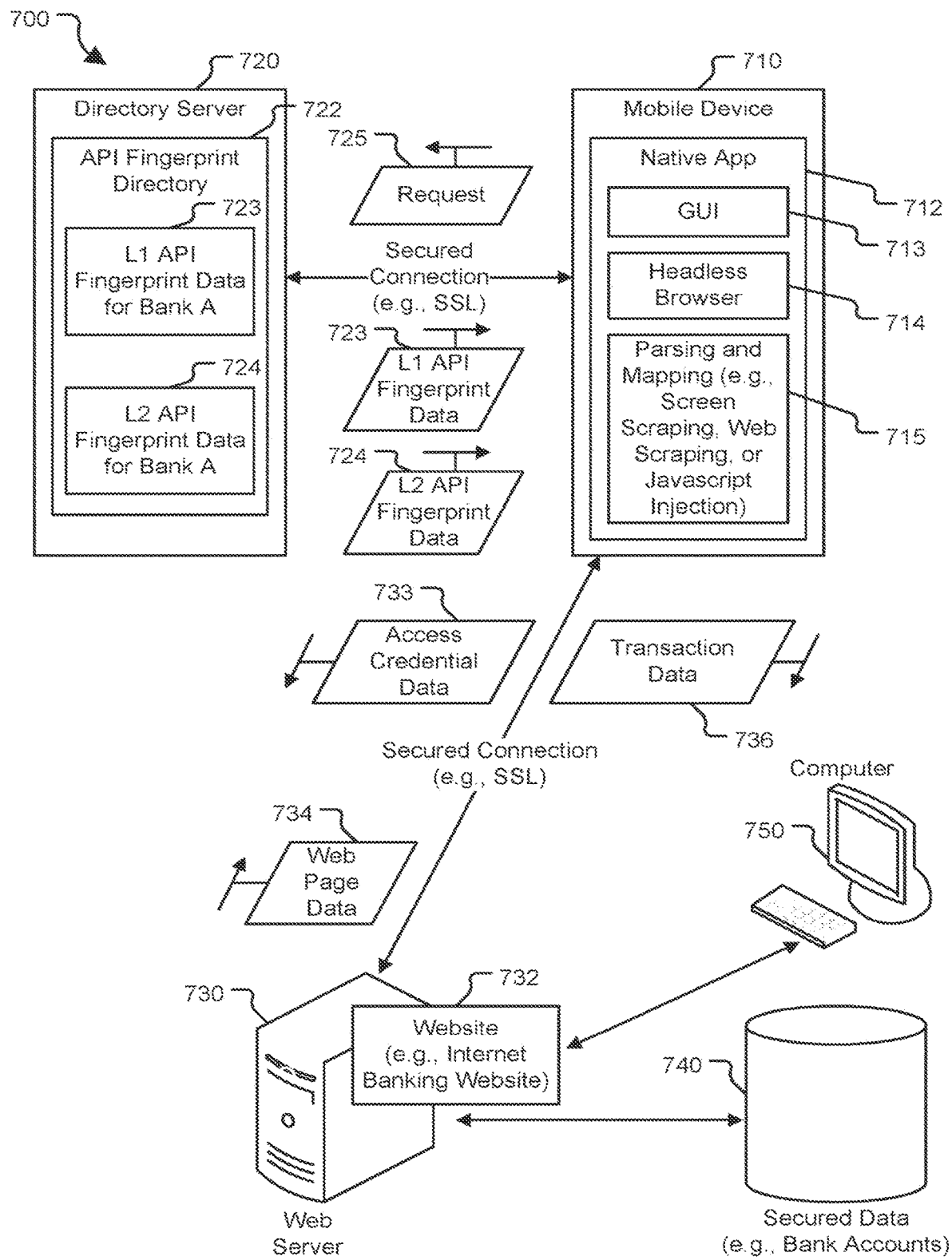
FIG. 9 is a diagram to illustrate additional aspects of the system of FIG. 7.

Referring to FIG. 9, additional operations of the system 700, including the mobile device 710, the directory server 720, and the web server 730, are described. FIG. 9 illustrates example operations performed by the system 700 when matching API fingerprint data is found at the directory server 720.

When a user opens the native app 712, the user may enter the name (or partial name) of a bank or other financial institution, e.g., via a user input device of the mobile device 710. The native app 712 sends the request 725 for API fingerprint data associated with the name to the directory server 720. The directory server 720 determines whether the name matches a name associated with the L1 API fingerprint data 723 and the L2 API fingerprint data 724. Based on a match, the directory server 720 sends the L1 API fingerprint data 723 and the L2 API fingerprint data 724 to the mobile device 710.

The L1 API fingerprint data 723 may include a "fingerprint" of the internet banking service pathways used for a user to log in, authenticate, and take other actions possible with internet banking. This unique service fingerprint may be loaded (e.g., embedded) into the native app 712 as an API component that configures headless browser interaction with the native app 712. For each financial institution (e.g., bank or credit union), there may be a unique fingerprint ID to configure how the embedded API interacts between the headless browser 714 and the internet banking software (e.g., of the website 732). The L2 API fingerprint data 724 may include a "fingerprint" of internet banking service pathways used to perform one or more transactions, such as online bill-pay or balance transfer. This unique service fingerprint may be loaded into the native app 712 as an embedded API component that configures headless browser interaction with the native app 712 for the bill-pay, balance transfer, one or more other transactions, or a combination thereof.

After receiving the relevant API fingerprint data, the native app 712 accesses the website 732. For example, the native app 712 may access the website 732 and receive the web page data 734 from the web server 730. The web page data 734 includes data for a login page of the website 732. The native app 712 may prompt, via the GUI 713, the user to enter login information such as a username, a password, information for multi-factor authentication, or a combination thereof. The information (e.g., the access credential data 733) is mapped to one or more elements of the website 732 using the L1 API fingerprint data 723, and the access credential data 733 are sent to the web server 730. The need to pass in additional authentication information is determined by the headless browser 714 parsing the initial response to the application passing in the username/password. If the website 732 responds in a way that was previously fingerprinted as being associated with a multi-factor authentication request, the native app 712 prompts the user to enter such information, which may be obtained via an out-of-band channel, such as e-mail or text message. Similarly, if the website 732 responds to an authentication attempt with a multi-factor authentication challenge, the API fingerprint data may indicate how to respond to such a challenge, and the native app 712 may parse the challenge so that the challenge can be relayed to the user in the GUI 713 of the native app 712. The resulting response from the user is then passed back through the virtual API into the headless browser 714 and then relayed from the headless browser 714 to the web server 730 hosting the interne banking website 732.

Responsive to verifying the access credential data 733, the web server 730 logs the mobile device 710 into the website 732. The login may include providing second webpage data (e.g., the second web page data 735 of FIG. 7) to the mobile device 710 via the secure connection between the headless browser 714 and the web server 730. The second webpage data may include user-specific information, such as the user's name, account number(s), balance(s), other information, or a combination thereof. The native app 712 parses the second webpage data to identify the user-specific data and display the user-specific data, e.g., via the GUI 713.

Additionally, the second webpage data may include one or more transactional elements. The one or more transactional elements may include elements associated with bill-pay functionality, balance transfer functionality, other online banking functionality, or a combination thereof. Based on a second user input that indicates a command, the native app 712 generates transaction data 736. The transaction data 736 may map the command from the native app 712 to the website 732 based on the L2 API fingerprint data 724. The native app 712 sends the transaction data 736 to the web server 730 to cause performance of the command. For example, the transaction data 736 may cause performance of an automatic bill pay operation, a balance transfer operation, another online banking operation, or a combination thereof.

To illustrate, during operation of the native app 712, the native app 712 receives a user command, such as a command to transfer funds between two accounts, as an illustrative nonlimiting example. In response to receiving the user command, the headless browser 714 sends transaction data 736 to the website 732 via a secured connection, where the transaction data 736 indicates a modification to be made to the secured data 740. For example, the transaction data 736 may correspond to HTTP command(s) that would be issued by the computer 750 when requesting a funds transfer operation on the website 732. Thus, from the perspective of the website 732, there is no difference between transaction data originating from a computer and the transaction data 736 sent by the headless browser 714 at the mobile device 710. Upon receiving the transaction data 736, the web server 730 takes action to modify the secured data 740 (e.g., may initiate the funds transfer operation). After the modification to the secured data 740 is performed, the website 732 may transmit a transaction confirmation to the mobile device 710 to confirm the modification to the secured data 740 (e.g., completion of the funds transfer operation), and the transaction confirmation may optionally be displayed in the GUI 713 of the native app 712. The new balances of the user's accounts may also be displayed in the GUI 713 the next time the native app 712 performs a read operation on the secured data 740.

In this manner, when a user enters the name of a financial institution, the native app 712 queries the directory server 720 for API fingerprint data associated with the financial institution. If a match is found, the matching API fingerprint data is provided from the directory server 720 to the mobile device 710, and the native app 712 uses the API fingerprint data to login to the website 732, and possibly to perform a user command with respect to the secured data 740. If a match is not found, or if use of the API fingerprint data results in an error condition, new or updated API fingerprint data for the website 732 is generated at the mobile device 710, as described with reference to FIG. 7.

In one exemplary implementation, the native app 712 may determine, based on a user input, a plurality of names of financial institutions that potentially match the name. In a particular implementation, the native app 712 displays a list of the potentially matching financial institution names, and the user selects the appropriate name from the list. For example, the user may input "Fifth National Bank," and the native app 712 may return a list of names that includes "Fifth National Bank of Austin," "Fifth National Bank of Dallas," and "Fifth National Bank of Houston." The user may select one of the names from the list, and the native app 712 may request API fingerprint data associated with the selected name.

In an alternate implementation, the native app 712 attempts to login to websites corresponding to each of the potentially matching names. To illustrate, if the user enters "Fifth National Bank", and there are three fingerprinted financial institutions that match the name (e.g., "Fifth National Bank of Austin," "Fifth National Bank of Dallas," and "Fifth National Bank of Houston"), the native app 712 attempts to login to websites of each of the fingerprinted financial institutions. For example, the native app 712 may prompt the user to enter the access credential data 733 (e.g., a username, a password, etc.), and the native app 712 uses the access credential data 733 and API fingerprint data corresponding to each of the potential matching financial institutions to login to each of the corresponding web sites. In some implementations, the corresponding websites are indicated by the API fingerprint data corresponding to the financial institutions. In response to a successful login to one of the websites, the native app 712 displays, via the GUI 713, the user-specific information that is parsed from webpage data from the successfully logged-in website. For example, if the access credential data 733 enables a successful login to the website for "Fifth Bank of Austin," the native app 712 displays, via the GUI 713, account information for the user with the particular financial institution (e.g., "Fifth Bank of Austin"). Once the particular financial institution is identified, the particular financial institution may be used as a default selection by the native app 712, at least until a different name is entered by the user, and the process begins again. In this manner, the native app 712 attempts to login to each potentially matching website such that the user is able to enter a name (or a partial name) of a financial institution and, if API fingerprint data is found, be logged into the website without having to select the full name from a list of names displayed by the native app 712. This may save the user time and improve an overall user experience with the native app 712. Additionally, because the attempted logins are coming from the mobile device 710 and not from a centralized server, it may be difficult or undesirable for financial institutions to block the attempted logins.

Figure 10:
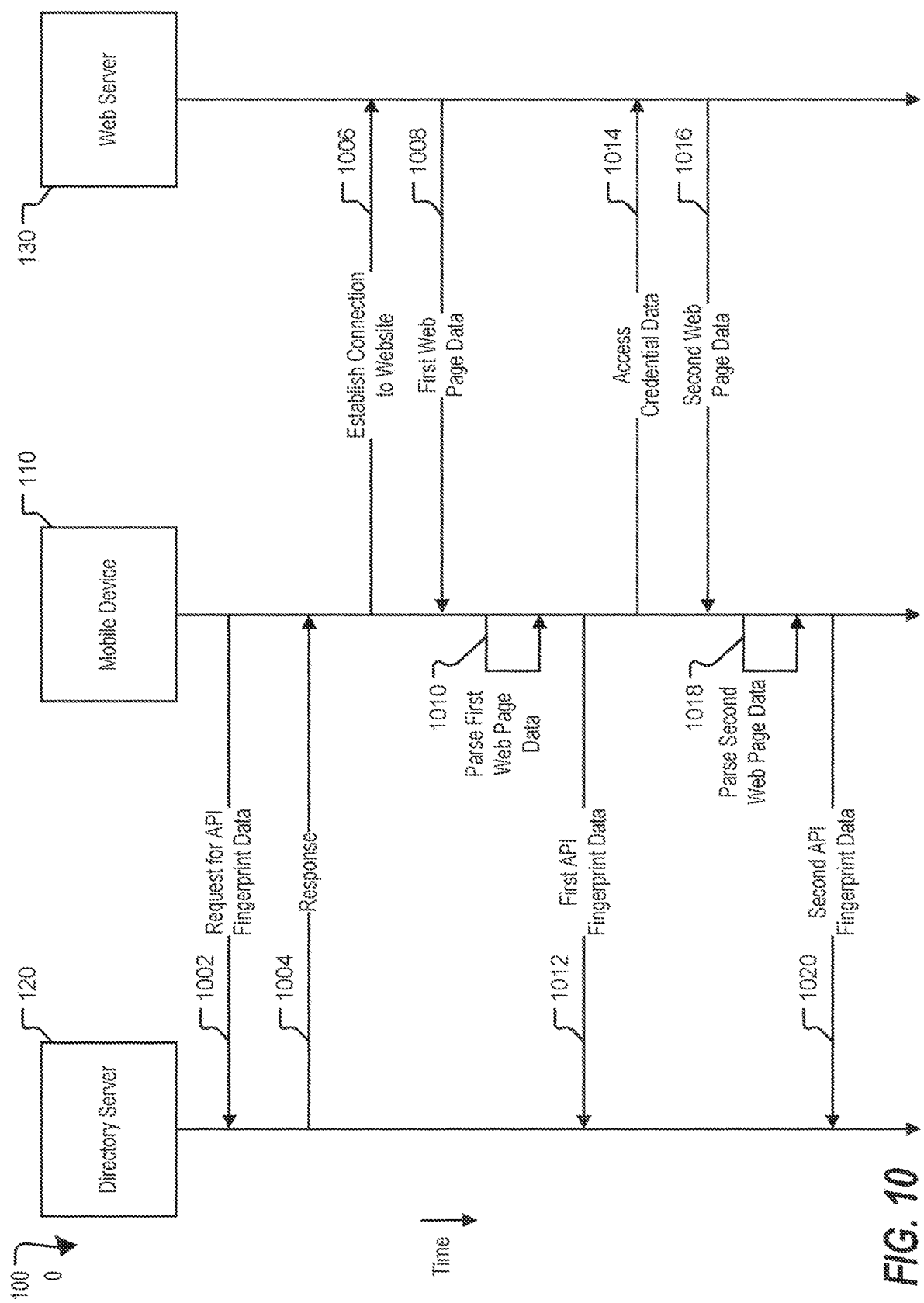
FIG. 10 is a first ladder diagram to illustrate exemplary operation of the system of FIG. 7.

Referring to FIG. 10, a ladder diagram 1000 of operations of the system 700 of FIG. 7 is shown. For example, the ladder diagram 1000 depicts an example of generating API fingerprint data when no matching API fingerprint data is found. The ladder diagram includes the mobile device 710 (executing the native app 712), the directory server 720, and the web server 730 (hosting the website 732).

During operation of the system 700, at time 1002, the mobile device 710 sends a request for API fingerprint data to the directory server 720. For example, the native app 712 may receive a name (or a partial name) of a financial institution, and the native app 712 sends the request 725 that includes or indicates the name to the directory server 720. At time 1004, the directory server 720 sends a response indicating that no API fingerprint data has been found to the mobile device 710. For example, in response to determining that no API fingerprint data matching the name can be found in the API fingerprint directory 722, the directory server sends the response 726 to the mobile device 710.

At time 1006, the mobile device 710 establishes a connection to a website. For example, the native app 712 may prompt the user to enter an address of the website 732, and the native app 712 may use the address to access the website 732 through the headless browser. At time 1008, the mobile device 710 receives first webpage data from the web server 730. For example, the web server 730 provides the web page data 734 to the mobile device 710. The web page data 734 may include or correspond to a login page of the website 732.

At time 1010, the mobile device 710 parses the web page data 734 to generate the L1 API fingerprint data 723. For example, the native app 712 may perform a screen/web scraping operation, a Javascript injection operation or other supported language interpreted by a web browser, a DOM inspection operation, or a combination thereof, to determine mapping between one or more elements of the web page data 734 and the native app 712. The one or more elements may include an input for a username, an input for a password, one or more steps of a multi-factor identification, or a combination thereof. The mapping between the one or more elements of the web page data 734 (e.g., the login page) and the native app 712 may be stored as the L1 API fingerprint data 723. At time 1012, the mobile device 710 sends first API fingerprint data to the directory server 720. For example, the mobile device 710 sends the L1 API fingerprint data 723 to the directory server 720 for storage in the API fingerprint directory 722. In some implementations, the directory server 720 may verify the L1 API fingerprint data 723 and may return a verified (e.g., signed) copy of the L1 API fingerprint data 723 to the mobile device 710.

At time 1014, the mobile device 710 sends access credential data to the web server 730. For example, the mobile device 710 sends the access credential data 733 to the web server 730. The access credential data 733 is generated in accordance with the L1 API fingerprint data 723. At time 1016, the mobile device 710 receives second webpage data from the web server 730. For example, the web server 730 provides the second web page data 735 to the mobile device 710 in response to receiving the access credential data 733. The second web page data 735 may include user-specific data, such as the user's name, account number(s), account balance(s), and other information. The second web page data 735 may also include one or more transactional elements, such as elements that enable online bill paying functionality, online account transfer functionality, online credit card payment, online deposit or withdrawal functionality, other functionality, or a combination thereof.

At time 1018, the mobile device 710 parses the second web page data 735 to generate the L2 API fingerprint data 724. For example, the native app 712 may perform a screen/web scraping operation, a Javascript injection operation or other supported language interpreted by a web browser, a DOM inspection operation, or a combination thereof, to determine mapping between one or more transactional elements of the second web page data 735 and the native app 712. At time 1020, the mobile device 710 sends second API fingerprint data to the directory server 720. For example, the mobile device 710 sends the L2 API fingerprint data 724 to the directory server 720 for storage in the API fingerprint directory 722. In some implementations, the directory server 720 may verify the L2 API fingerprint data 724 and may return a verified (e.g., signed) copy of the L2 API fingerprint data 724 to the mobile device 710.

In this manner, the operations described with reference to FIG. 10 enable the mobile device 710 to generate API fingerprint data for a website that has not previously been fingerprinted. The API fingerprint data is provided to the directory server 720 and stored for future use by the mobile device 710 (or other mobile devices) executing the native app 712.

Figure 11:
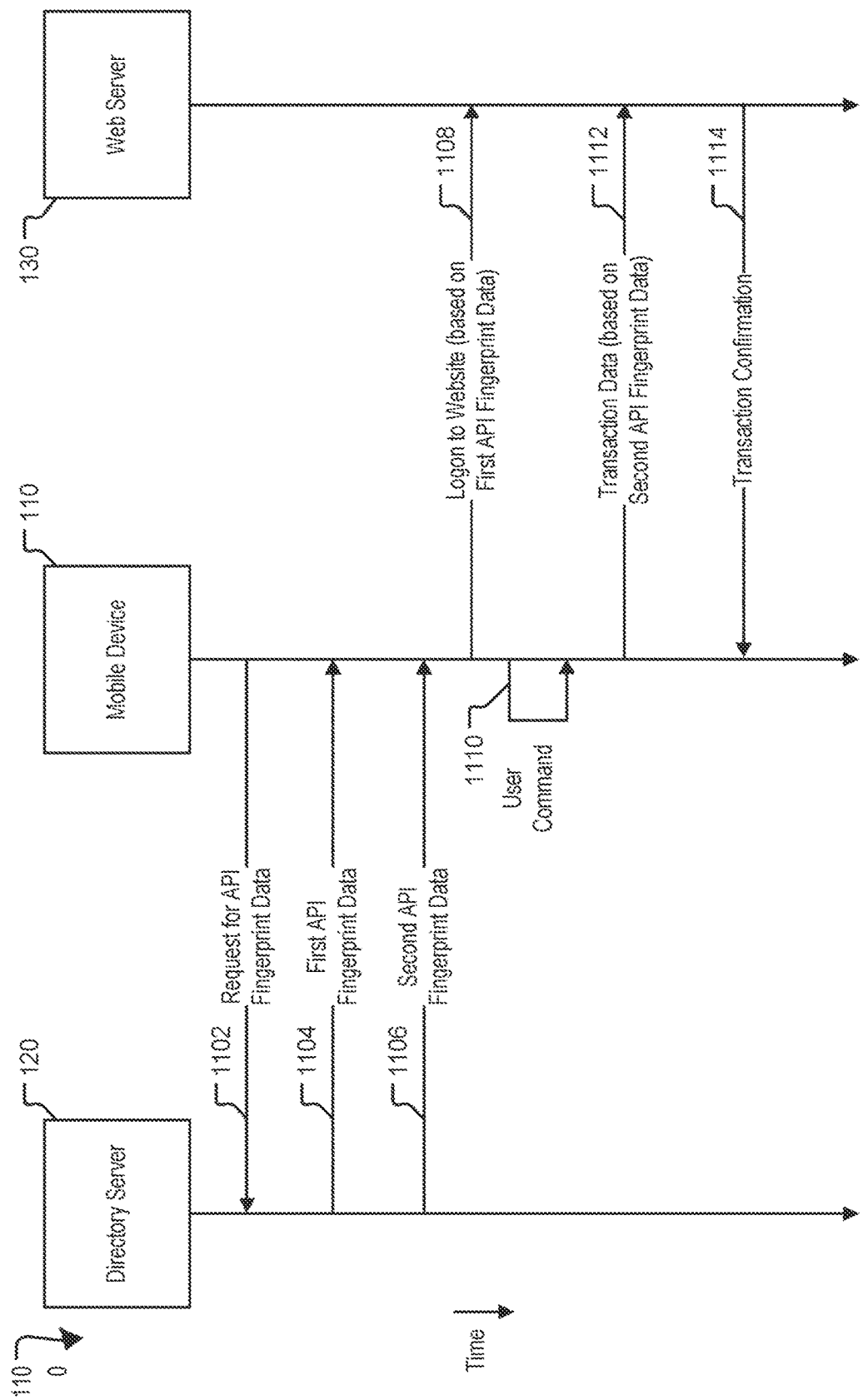
FIG. 11 is a second ladder diagram to illustrate exemplary operation of the system of FIG. 7.

Referring to FIG. 11, a ladder diagram 1100 of operations of the system 700 of FIG. 7 is shown. For example, the ladder diagram 1100 depicts an example of using API fingerprint data to access a website. The ladder diagram includes the mobile device 710 (executing the native app 712), the directory server 720, and the web server 730 (hosting the website 732).

During operation of the system 700, at time 1102, the mobile device 710 sends a request for API fingerprint data to the directory server 720. For example, the mobile device may receive a user input indicating a name (or a partial name) of a financial institution. The mobile device 710 sends the request 725 that identifies the name to the directory server 720.

At time 1104, the directory server 720 sends first API fingerprint data to the mobile device 710. For example, the directory server 720 may detect a match between the name included in the request 725 and a name associated with the L1 API fingerprint data 723. Responsive to detecting the match, the directory server 720 sends the L1 API fingerprint data 723 to the mobile device 710. At time 1106, the directory server 720 sends second API fingerprint data to the mobile device 710. For example, the directory server sends the L2 API fingerprint data 724 to the mobile device 710. Although illustrated as occurring at two separate times, in other implementations, the L1 API fingerprint data 723 and the L2 API fingerprint data 724 are sent to the mobile device 710 at the same time.

At time 1108, the mobile device 710 logs in to a website based on the first API fingerprint data. For example, the native app 712 establishes a secure connection (e.g., via a headless browser) with a website identified by the L1 API fingerprint data 723. To further illustrate, the native app 712 sends the access credential data 733 to the web server 730. The access credential data 733 is generated in accordance with the L1 API fingerprint data 723. The access credential data 733 may be entered via a user input device of the mobile device 710 or may be securely stored at the mobile device 710. After sending the access credential data 733 to the web server 730, the web server 730 may verify the access credential data 733 and enable login to the website 732.

At time 1110, the mobile device 710 receives a user command. For example, the user may enter a command via a user input device of the mobile device 710. In a particular example, the command includes a transaction to be performed on the secured data 740 stored by the website 732. For example, the user command may include a command to pay a bill, a command to perform a withdrawal, a command to perform a deposit, a command to transfer at least a portion of a balance from one account to another account, another transactional command, or a combination thereof. At time 1112, the mobile device 710 sends transaction data to the web server 730. For example, the mobile device 710 sends the transaction data 736 to the web server 730, where the transaction data identifies the user command. The transaction data 736 is generated in accordance with the L2 API fingerprint data 724. The transaction data 736 causes the website 732 to read or modify the secure data 740, as explained herein with reference to FIG. 7. After the user command is performed, at time 1114, the web server 730 sends a transaction confirmation to the mobile device 710. The transaction confirmation indicates to the mobile device that the user command has been performed by the web server 730. Responsive to receiving the transaction confirmation, a confirmation may be displayed to the user via the GUI 713 of the native app 712. Alternatively, no confirmation may be provided, and it may be assumed that user commands are performed if there is no error message.

In this manner, the operations described with reference to FIG. 11 enable the mobile device 710 to use API fingerprint data that has been previously generated to access a website. The API fingerprint data indicates mappings between elements of the website and the native app 712, and the mappings are used to generate data, such as access credential data or transaction data, that is passed from the mobile device 710 to the web server 730.

Figure 12:
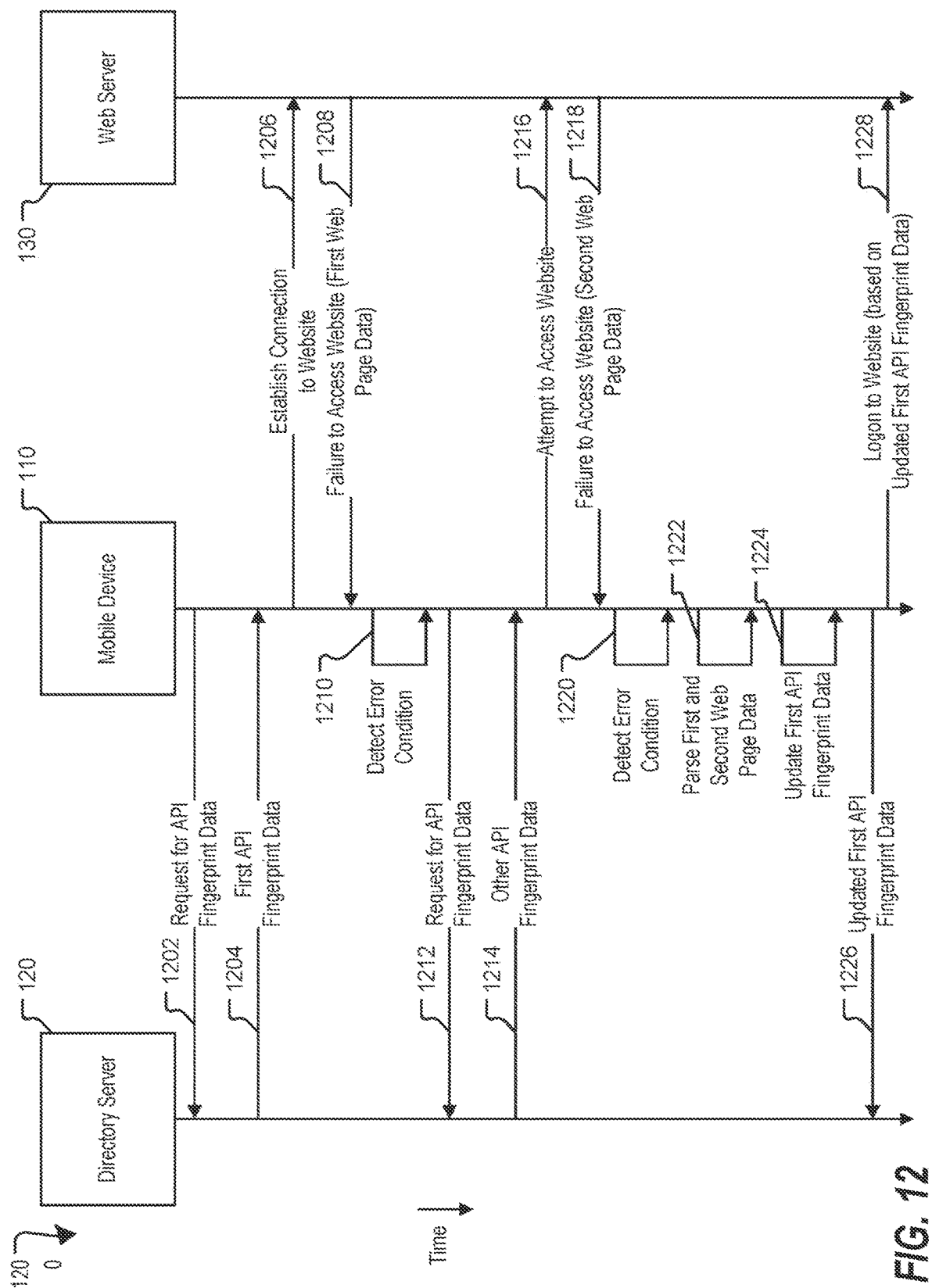
FIG. 12 is a third ladder diagram to illustrate exemplary operation of the system of FIG. 7.

Referring to FIG. 12, a ladder diagram 1200 of operations of the system 700 of FIG. 7 is shown. For example, the ladder diagram 1200 depicts an example of updating API fingerprint data when an error occurs. The ladder diagram includes the mobile device 710 (executing the native app 712), the directory server 720, and the web server 730 (hosting the website 732).

During operation of the system 700, at time 1202, the mobile device 710 sends a request for API fingerprint data to the directory server 720. For example, the mobile device may receive a user input indicating a name (or a partial name) of a financial institution. The mobile device 710 may send the request 725 that identifies the name to the directory server 720.

At time 1204, the directory server 720 sends first API fingerprint data to the mobile device 710. For example, the directory server 720 may detect a match between the name included in the request 725 and a name associated with the L1 API fingerprint data 723. Responsive to detecting the match, the directory server 720 sends the L1 API fingerprint data 723 to the mobile device 710.

At time 1206, the mobile device 710 attempts to establish a connection with a website. For example, the L1 API fingerprint data 723 identifies an address of the website 732, and the native app 712 attempts to establish a secure connection with the website 732 using the headless browser 714. Attempting to establish the secure connection may include sending the access credential data 733 to the web server 730. The access credential data 733 may be generated in accordance with the L1 API fingerprint data 723.

At time 1208, the mobile device 710 fails to access the website. The failure may occur due to a change in layout of the website, a change in the online banking software that supports the website, a change in software that supports transactional functions of the website, or a combination thereof. In addition to the failure, the web server 730 sends first web page data to the mobile device 710. The first web page data may include data of an error message or an error page in addition to data of the login page. At time 1210, the mobile device 710 detects an error condition. For example, the native app 712 detects the failure to login to the website 732.

At time 1212, the mobile device 710 sends a request for other API fingerprint data to the directory server 720. For example, the mobile device 710 sends a request for other API fingerprint data that may be used to attempt to login to the website 732. The other API fingerprint data may include or correspond to API fingerprint data that is common to multiple financial institutions. For example, although there may be thousands or more financial institutions that offer online banking capabilities, a large percentage of these financial institutions may be supported by the same underlying online banking software. Accordingly, if a particular online banking software is common to a plurality of financial institutions, then API fingerprint data is also common to the plurality of financial institutions. For this reason, one or more sets of API fingerprint data may be generated based on known online banking software. This API fingerprint data may be used as a default, or in case of error conditions. Thus, at time 1214, the directory server 720 sends other API fingerprint data to the mobile device 710. The other API fingerprint data may include or correspond to API fingerprint data that is known valid for a plurality of financial institutions.

At time 1216, the mobile device 710 attempts to access the website. For example, the native app 712 attempts to access the website 732 based on the other API fingerprint data. If the access is successful, the first API fingerprint data is updated based on the other API fingerprint data, and the operations proceed as described with reference to FIG. 11. However, not all financial institutions use the same online banking software. Therefore, in some situations, the other API fingerprint data is not a match, and a failure to access the website occurs at time 1218. In addition to failing to login, the web server 730 sends second web page data to the mobile device 710. The second web page data may include data of an error message or an error page in addition to data of the login page. At time 1220, the mobile device 710 may detect an error condition. For example, the native app 712 may detect the failure to login to the website 732.

At time 1222, the mobile device 710 parses the first web page data and the second web page data. For example, the native app 712 may perform screen scraping, web scraping, Javascript injection, DOM inspection, and/or a combination thereof to determine locations of one or more elements of a login page of the website 732. The operations are similar to the operations described with reference to FIGS. 7 and 10. Performing the operations determines a mapping of one or more elements in the login page to one or more elements of the native app 712. At time 1224, the mobile device 710 updates the first API fingerprint data. For example, the native app 712 may update the L1 API fingerprint data 723 based on the new mappings determined based on the login page.

At time 1226, the mobile device sends the updated first API fingerprint data to the directory server 720. For example, the native app 712 sends the updated L1 API fingerprint data 723 to the directory server 720 for storage. In some implementations, the directory server 720 may verify (e.g., sign) the updated L1 API fingerprint data 723 and provide the verified L1 API fingerprint data 723 back to the mobile device 710. At time 1228, the mobile device 710 logs in to the website. For example, the native app 712 may send the access credential data 733 to the web server 730. At this time, the access credential data 733 is generated in accordance with the updated first API fingerprint data (e.g., the updated L1 API fingerprint data 723).

In this manner, the operations described with reference to FIG. 12 enable the mobile device 710 to adapt to changes in online banking websites. For example, when an error condition is detected (e.g., when a failure to login occurs), the native app 712 may request additional API fingerprint data. If the additional API fingerprint data does not enable the native app 712 to login to the website, the native app 712 generates API fingerprint data for the website. This API fingerprint data is used to update the API fingerprint data stored at the directory server 720.

Figure 13:
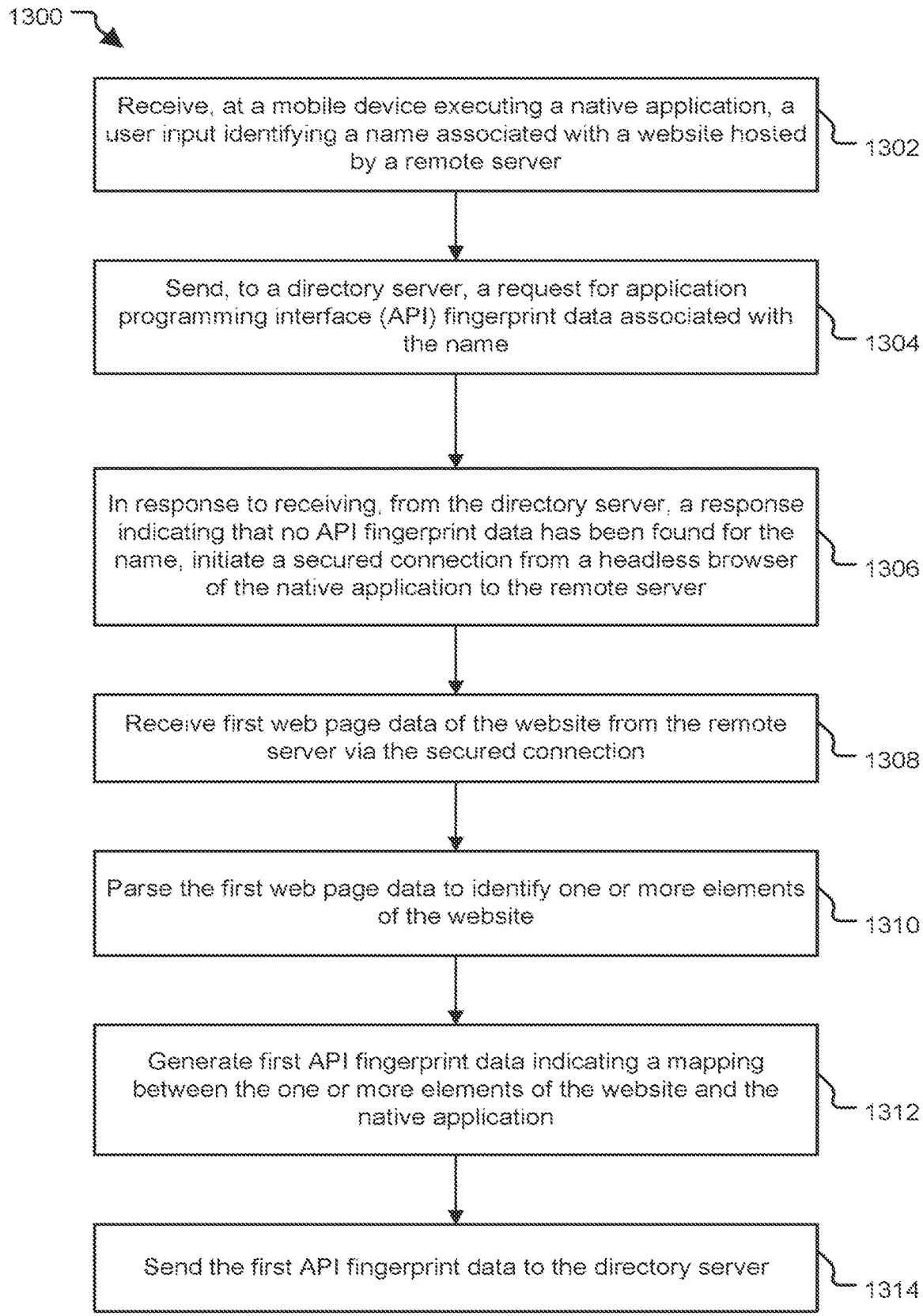
FIG. 13 is a flowchart to illustrate an exemplary method of generating API fingerprint data at a mobile device.

Referring to FIG. 13, an illustrative aspect of a method 1300 of operation at a mobile device is shown. In particular examples, the method 1300 may be performed by the mobile device 710 of FIG. 7.

The method 1300 includes receiving, at a mobile device executing a native application, a user input identifying a name associated with a website hosted by a remote server, at 1302. For example, the mobile device 710 may execute the native app 712 of FIG. 7. A user may enter a name of a financial institution (e.g., that has a website that supports online banking) via a user input device of the mobile device 710. The method 1300 includes sending, to a directory server, a request for application programming interface (API) fingerprint data associated with the name, at 1304. For example, the mobile device 710 may send the request 725 to the directory server 720.

The method 1300 includes, in response to receiving, from the directory server, a response indicating that no API fingerprint data has been found for the name, initiating a secured connection from a headless browser of the native application to the remote server, at 1306. For example, in response to receiving the response 726 that indicates that no API fingerprint data has been found at the API fingerprint directory 722, the mobile device 710 may initiate a secured connection with the web server 730 that hosts the website 732.

The method 1300 includes receiving first web page data of the website from the remote server via the secured connection, at 1308. For example, the mobile device 710 may receive the web page data 734 (e.g., web page data of a login page of the website 732) from the web server 730. The method 1300 includes parsing the first web page data to identify one or more elements of the website, at 1310. For example, the mobile device 710 may perform screen scraping, web scraping, Javascript injection, DOM inspection, another operation associated with a language supported by the headless browser, or a combination thereof, to identify one or more elements within the web page data 734.

The method 1300 includes generating first API fingerprint data indicating a mapping between one or more elements of the website and the native application, at 1312. For example, the mobile device 710 may generate the L1 API fingerprint data 723 to indicate the mapping. The method 1300 further includes sending the first API fingerprint data to the directory server, at 1314. For example, the mobile device 710 may send the L1 API fingerprint data 723 to the directory server 720 for storage in the API fingerprint directory 722.

In a particular implementation, the method 1300 includes sending, by the headless browser via the secured connection, access credential data to the remote server, receiving second web page data of the website from the remote server via the secured connection, parsing the second web page data to identify user-specific data, and displaying, via a display device coupled to the processor, the user-specific data in a graphical user interface of the native application. For example, the mobile device 710 may receive the second web page data 735 from the web server 730. The second web page data may be parsed to identify user specific data, such as a username, user account number(s), user account balance(s), or other user-specific information, and the user-specific information may be displayed via the GUI 713 of the native app 712. In some implementations, the method 1300 includes receiving a user command via a user input device and sending, by the headless browser via the secured connection, the transaction data to the remote server to modify secured data based on the user command. For example, the mobile device 710 may receive a user input and may sent the transaction data 736 to the web server 730. In a particular implementation, the method 1300 further includes parsing the second web page data to identify locations of one or more transactional elements of the website, generating second API fingerprint data indicating a mapping between transactional elements of the website and transactional elements of the native application, and sending the second API fingerprint data to the directory server. For example, the mobile device 710 may perform screen scraping, web scraping, Javascript injection, DOM inspection, or a combination thereof, to determine the locations of one or more transactional elements of the web site, such as online bill pay elements, balance transfer elements, withdrawal elements, deposit elements, or a combination thereof. The one or more transactional elements of the website may be configured to enable a read operation with respect to secured data (e.g., the secured data 740 of FIG. 7), a write operation with respect to the secured data, or both.

In a particular implementation, the method 1300 includes receiving a second user input identifying a second name associated with a second website hosted by a second remote server, sending, to the directory server, a request for API fingerprint data associated with the second name, and receiving, from the directory server, particular API fingerprint data associated with the second name. For example, as described with reference to FIGS. 9 and 11, the mobile device 710 may send the request 725 to the directory server 720 and, if a name indicated in the request 725 matches a name associated with API fingerprint data stored at the directory server 720, the API fingerprint data is provided to the mobile device 710. In some implementations, the method 1300 may further include logging in to the second website via the headless browser based on the particular API fingerprint data and access credential data. For example, the mobile device may receive the L1 API fingerprint data 723 from the directory server 720 and may receive the access credential data 733 (e.g., via user input or from storage at the mobile device 710). The mobile device may format the access credential data 733 based on the L1 API fingerprint data 723 and send the access credential data 733 to the web server 730.

In some implementations, the method 1300 may further include detecting an error condition associated with logging into the second website based on the particular API fingerprint data, sending, to the directory server, a request for additional API fingerprint data associated with the second website, receiving, from the directory server, second particular API fingerprint data associated with a different website, and logging in to the second website via the headless browser based on the second particular API fingerprint data and access credential data. For example, as described with reference to FIG. 12, the mobile device 710 may detect an error condition associated with a failure to log into the website 732. Responsive to detecting the error condition, the mobile device 710 may send a request for additional API fingerprint data from the directory server 720. The additional API fingerprint data may correspond to a plurality of financial institutions (e.g., the additional API fingerprint data may be used to login to webpages of multiple different financial institutions, for example because the websites of the multiple financial institutions use the same underlying online banking software). The mobile device 710 may attempt to login to the website 732 using the additional API fingerprint data.

The method 1300 may further includes detecting an error condition associated with logging into the second website based on the particular API fingerprint data, parsing second web page data of the second website to identify locations of one or more elements of the second website, generating updated API fingerprint data indicating a mapping between the one or more elements of the second website and the native application, and sending the updated API fingerprint data to the directory server. For example, as further described with reference to FIG. 12, the mobile device 710 may detect an error condition associated with a failure to login using the additional API fingerprint data. Detecting the error condition may trigger the mobile device 710 to generate new (e.g., updated) API fingerprint data for the website, such as by performing screen scraping, web scraping, Javascript injection, DOM inspection, or a combination thereof.

In another particular implementation, the method 1300 includes determining, based on the user input, a plurality of websites potentially associated with the name, receiving, from the directory server, API fingerprint data associated with each of the plurality of websites, and attempting login to each of the plurality of websites based on the API fingerprint data and based on access credential data. For example, as described with reference to FIG. 9, the user may enter "Fifth National Bank", and the mobile device 710 may request API fingerprint data for "Fifth National Bank." However, the directory server 720 may store API fingerprint data for "Fifth National Bank of Austin," "Fifth National Bank of Dallas," and "Fifth National Bank of Houston." The mobile device 710 may receive API fingerprint data for each of the three possible matches and may attempt to login to a website corresponding to each of the potential matches using the user's access credential data. Responsive to successfully logging into one of the websites, the mobile device 710 may display the user's account information. Because the accesses are coming from the mobile device, and not a centralized server, it may be difficult or undesirable for the financial institutions to block the access attempts.

Thus, the method 1300 of FIG. 13 enables generation of API fingerprint data by a mobile device. The API fingerprint data may be generated "on the fly" (e.g., during accessing of the website 732) by the mobile device and stored at a directory server for later use by the mobile device, or by other mobile devices, that execute a native application.

It is to be understood that in alternative aspects, one or more steps of the method 1300 of FIG. 13 may be performed in a different order, may be combined or performed at least partially concurrently, or may be omitted. Further, one or more other steps may be added.

Figure 14:
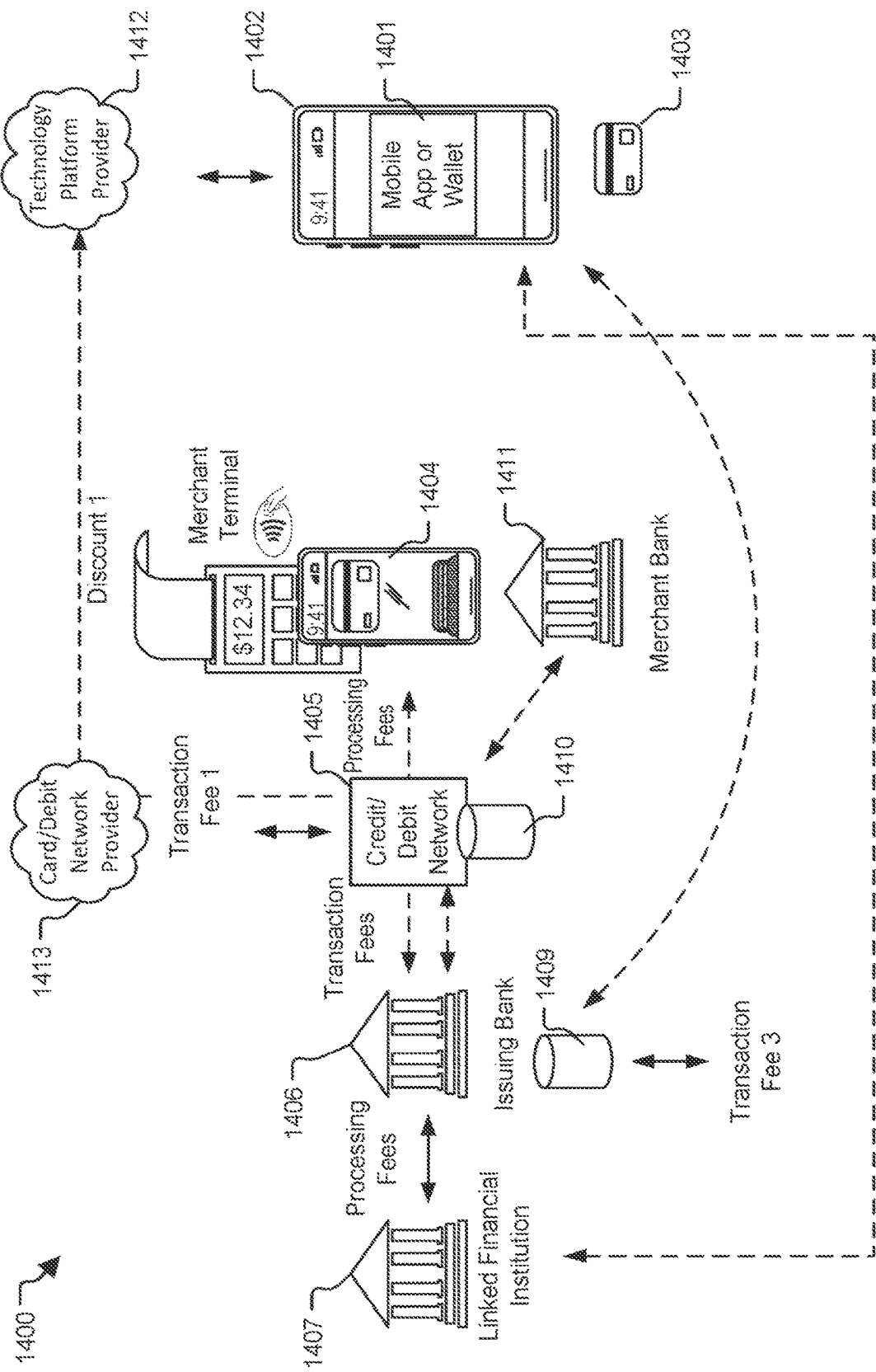
FIG. 14 is an exemplary operational flow diagram to illustrate a system of VirtualAPI technology, embodied in the form of software development kit (SDK) used within or in connection with a mobile application, mobile payment wallet and/or mobile operating system.

Referring to FIG. 14, a system (1400) that includes Virtual API technology, embodied in the form of an SDK, can be combined and used within a mobile application, a mobile payment wallet or mobile operating system (1401). This system (1400) may use NFC, optical barcode, or other technology for interacting with a merchant processing terminal/point of sale system (1404).

This system runs on a user's mobile device (1402) or personal computer as compiled software. The SDK, when combined in a mobile application, payment wallet, or mobile operating system can be configured in association with an issuing bank, credit/debit network or third party to provision a Universal card BIN as a debit, credit or pre-paid account (1403) associated with a unique ID for a given user of a mobile app, wallet, or operating system. This Universal card BIN (1403) may be dynamic/changeable.

The Universal Card BIN (1403) is not directly associated with a user's financial account with the card issuer, credit network or third party. The Universal Card BIN (1403) interacts with the Virtual API-enabled SDK (1401) to establish a link (or proxy) between one or more of a user's existing financial institutions (1407) that have been fingerprinted and made available via the Company's VirtualAPI.

This link allows for both information (such as available balance, pending transactions, or other data) and payment/transfer actions between the user's linked accounts as a source of funds for the Universal Card BIN. This is accomplished by instructing the linked Funding Source (1407) to pay an external account at the Issuing Bank via ACH, Real-Time Payment, or other transfer method provided by the Linked Bank and fingerprinted and made available by the Company's VirtualAPI (1402), or by using the VirtualAPI-enabled SDK (1401) to use information from the linked Funding account to allow the Issuing Bank to pull funds via ACH, real-time payment, or other transfer method in the event that funds cannot be moved between the linked Funding Source bank (1407) and the Issuing Bank (1406) immediately to settle payments using the Universal Card BIN (1403) provisioned in the Mobile Wallet, App, or operating system.

In the case that funds from bank (1407) cannot be moved to issuing bank (1406) immediately, the information provided can be used by the issuing bank (1406) and its Authorization Platform/Business Rules (1409) to allow for payment authorization and settlement of funds to the Credit/Debit Network (1405) temporarily while funds settle between the banks (1407) and (1406). It is the real-time information provided by the VirtualAPI-enabled SDK (1401) from the banks (1407) to (1406) that provides the ability to safely and securely allow these payments, knowing that funds are good and available AND that the transfer from bank (1407) to bank (1406) is in process.

The VirtualAPI-enabled SDK (1401) on the user's mobile device (1402) may be used to either persistently or intermittently monitor the transaction, the transfer and other account information associated with bank (1407) to facilitate payments and settlements.

The illustrations and aspects of the disclosure described herein are intended to provide a general understanding of the disclosure and are not intended to exhaustively illustrate all possible aspects, some of which may incorporate substitute arrangements to achieve the same or similar objectives. The present disclosure covers any and all subsequent adaptations or variations of aspects described herein.

It is to be understood that the figures may not be drawn to scale, and the Abstract is not to be used to interpret or limit the scope or meaning of the claims. In addition, the use of the terms invention, embodiment, aspect, or example do not require that the described features be grouped together. The disclosure is not to be interpreted as intending any claimed aspect, example, or embodiment to require more elements than recited in a claim.

The subject matter described herein is thus illustrative rather than restricting, and the claims are intended to cover all falling within the scope of the present disclosure. To the maximum extent allowed by law, the scope of the present disclosure is to be determined by the broadest permissible interpretation of the following claims (which are hereby incorporated into the detailed description) and their equivalents, and shall not be restricted or limited by the foregoing detailed description.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network.

Furthermore, it should be appreciated that the various links, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Exemplary aspects are directed toward:
A system comprising:
a mobile device including a interconnected display, storage, processor and memory that stores instructions;
a headless browser configured to execute on the mobile device,
the instructions, when executed, perform a process including:
sending an access credential to a remote server;
receiving web page data from the remote server;
parsing the web page to identify user-specific data;
displaying the user specific data on the display of the mobile device in a native application;
sending via the headless browser transaction data to the remote server to modify secure data based at least on a command; and
receive a confirmation of the modification of the secure data.
Any of the above aspects, wherein the mobile device is further configured to establish a secure connection to the remote server hosting a website.
Any of the above aspects, wherein the mobile device is further configured to receive a user input corresponding to the command.
Any of the above aspects, wherein the confirmation is via a secure connection.
Any of the above aspects, further comprising the remote server, the remote server configured to receive access credential data from the mobile device for emulation of a request to login to a website.
Any of the above aspects, further comprising the remote server, the remote server configured to transmit web page data to the mobile device.
Any of the above aspects, further comprising the remote server, the remote server configured to receive the request to modify the secure data.
Any of the above aspects, further comprising the remote server, the remote server configured to transmit the confirmation that the secure data has been modified.
Any of the above aspects, wherein the headless browser is an instance of a web browser that is executed by the mobile device without display of a graphical user interface (GUI).
Any of the above aspects, the instructions further configured to send to a directory server a request for application programming interface fingerprint data associated with a name corresponding to the website, and to take an action based on whether application programming interface data is found.
A method comprising:
instantiating a headless browser on a mobile communications device,
sending an access credential to a remote server;
receiving web page data from the remote server;
parsing the web page to identify user-specific data;
displaying the user specific data on a display of the mobile device in a native application;
sending, via the headless browser, transaction data to the remote server to modify secure data based at least on a command; and
receive a confirmation of the modification of the secure data.
Any of the above aspects, further comprising establishing a secure connection to the remote server hosting a website.
Any of the above aspects, further comprising receiving a user input corresponding to the command.
Any of the above aspects, wherein the confirmation is via a secure connection.
Any of the above aspects, further comprising receiving access credential data from the mobile device for emulation of a request to login to a website.

Any of the above aspects, further transmitting web page data to the mobile device.

Any of the above aspects, further comprising receiving the request to modify the secure data.

Any of the above aspects, further comprising transmitting the confirmation that the secure data has been modified.

Any of the above aspects, wherein the headless browser is an instance of a web browser that is executed by the mobile device without display of a graphical user interface (GUI).

Any of the above aspects, further comprising sending to a directory server a request for application programming interface fingerprint data associated with a name corresponding to the website, and to take an action based on whether application programming interface data is found.

A system on a chip (SoC) including any one or more of the above aspects.

One or more means for performing any one or more of the above aspects.

Any one or more of the aspects as substantially described herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors/controllers as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A system comprising:
a mobile device including: an interconnected display, storage, processor and memory that stores instructions;
a headless browser configured to execute on the mobile device, the headless browser emulating a non-headless browser,
the instructions, when executed by the mobile device, cause the mobile device to perform a method including:
instantiating the headless browser on the mobile device:
sending an access credential to a remote server;
receiving web page data associated with a webpage from the remote server, generating, at run time, Application Programming Interface (API) fingerprint data by parsing the web page data, wherein the API fingerprint data specifies mappings between one or more elements of the webpage from the remote server and one or more graphical user interface (GUI) elements present in a GUI of a native application;
parsing the web page data to identify user-specific data;
displaying the user specific data on the display of the mobile device in the GUI of the native application;
receiving, via one or more GUI elements of the native application, a command to perform a transaction at the remote server;
sending, from the headless browser, transaction data to the remote server to modify data, wherein the headless browser generates the transaction data based on the mappings specified by the API fingerprint data; and
receive, at the mobile device, a confirmation of the modification of the data.

2. The system of claim 1, wherein the mobile device is further configured to establish a secure connection to the remote server.

3. The system of claim 1, wherein the mobile device is further configured to receive a user input corresponding to the command.

4. The system of claim 1, wherein the confirmation is via a secure connection.

5. The system of claim 1, further comprising the remote server, the remote server configured to receive access credential data from the mobile device for emulation of a request to login to a website.

6. The system of claim 1, further comprising the remote server, the remote server configured to transmit the web page data to the mobile device.

7. The system of claim 1, further comprising the remote server, the remote server configured to receive a request to modify the data.

8. The system of claim 1, further comprising the remote server, the remote server configured to transmit the confirmation that the secure data has been modified.

9. The system of claim 1, wherein the headless browser is an instance of a web browser that is executed by the mobile device without display of a graphical user interface (GUI).

10. The system of claim 1, the instructions further configured to send to a directory server a request for API fingerprint data associated with a name corresponding to a website, and to take an action based on whether application programming interface data is found.

11. A method performed by a mobile device, comprising:
instantiating a headless browser on the mobile device, the headless browser emulating a non-headless browser,
sending an access credential to a remote server;
receiving web page data associated with a webpage from the remote server;
generating, at run-time, Application Programming Interface (API) fingerprint data by parsing the web page data, wherein the API fingerprint data specifies mappings between one or more elements of the webpage and one or more graphical user interface (GUI) elements present in a GUI of a native application;
parsing the web page data to identify user-specific data;
displaying the user specific data on a display of the mobile device in the GUI of the native application;
receiving, via one or more GUI elements of the native application, a command to perform a transaction on the remote server;
sending, from the headless browser, transaction data to the remote server to modify data, wherein the headless browser generates the transaction data based on the mappings specified by the API fingerprint data; and
receive, at the mobile device, a confirmation of the modification of the secure data.

12. The method of claim 11, further comprising establishing a secure connection to the remote server.

13. The method of claim 11, further comprising receiving a user input corresponding to the command.

14. The method of claim 11, wherein the confirmation is via a secure connection.

15. The method of claim 11, further comprising receiving access credential data from the mobile device for emulation of a request to login to a website.

16. The method of claim 11, further comprising transmitting the web page data to the mobile device.

17. The method of claim 11, further comprising receiving the request to modify the secure data.

18. The method of claim 11, further comprising transmitting the confirmation that the secure data has been modified.

19. The method of claim 11, wherein the headless browser is an instance of a web browser that is executed by the mobile device without display of a graphical user interface (GUI).

20. The method of claim 11, further comprising sending to a directory server a request for API fingerprint data associated with a name corresponding to a website, and to take an action based on whether application programming interface data is found.

21. The system of claim 1, wherein the API is at least based on an identification of user data.

22. The system of claim 1, wherein javascript is utilized for the API.

* * * * *